(12) United States Patent
DeGregoria et al.

(10) Patent No.: US 6,257,317 B1
(45) Date of Patent: *Jul. 10, 2001

(54) INTEGRATED HEAT RECOVERY VENTILATOR-HEPA FILTER

(75) Inventors: Anthony J. DeGregoria; Thomas J. Kaminski, both of Madison, WI (US)

(73) Assignee: ElasTek, Madison, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 08/893,833

(22) Filed: Jul. 11, 1997

(51) Int. Cl.[7] .................................................. F23L 15/02
(52) U.S. Cl. .................................. 165/8; 165/10; 165/54
(58) Field of Search ............................... 165/10, 9, 8, 6, 165/4, 54

(56) References Cited

U.S. PATENT DOCUMENTS

| | | |
|---|---|---|
| D. 376,842 | 12/1996 | Franklin et al. . |
| 2,931,189 | 4/1960 | Sigworth . |
| 3,036,444 | 5/1962 | Cochran . |
| 3,047,272 | 7/1962 | Speca . |
| 3,326,214 | 6/1967 | McCoy . |
| 3,599,443 | 8/1971 | Paine . |
| 3,978,912 | 9/1976 | Penny et al. . |
| 4,049,404 | 9/1977 | Johnson . |
| 4,391,321 | 7/1983 | Thunberg . |
| 4,411,310 | 10/1983 | Perry et al. . |
| 4,493,366 | 1/1985 | Ekman . |
| 4,512,392 | 4/1985 | van Ee et al. . |
| 4,577,678 | 3/1986 | Franenfeld et al. . |
| 4,589,476 | 5/1986 | Berner . |
| 4,594,860 | 6/1986 | Coellner et al. . |
| 4,665,805 | 5/1987 | Ekman . |
| 4,685,944 | 8/1987 | Allan et al. . |
| 4,688,626 | 8/1987 | Tengesdal . |
| 4,733,718 | 3/1988 | Schikowsky et al. . |
| 4,744,409 | 5/1988 | Berner . |
| 4,754,806 | 7/1988 | Astle, Jr. . |
| 4,815,522 | 3/1989 | Thunberg . |
| 4,817,708 | 4/1989 | Ono et al. . |
| 4,875,520 | 10/1989 | Steele et al. . |
| 4,909,307 | 3/1990 | Besik . |
| 4,952,283 | 8/1990 | Besik . |
| 5,002,116 | 3/1991 | Hoagland . |
| 5,010,594 | 4/1991 | Suzuki et al. . |

(List continued on next page.)

FOREIGN PATENT DOCUMENTS

| | | |
|---|---|---|
| 3143088 A1 | 5/1983 | (DE) . |
| 895463 | 5/1962 | (GB) . |
| 1360064 | 7/1974 | (GB) . |

OTHER PUBLICATIONS

ASHRAE 62–1989 Standard of American Society of Heating, Refrigeration, and Air Conditioning Engineers Inc., Atlanta, GA (contents page, pp1, 3–26)(1989).

(List continued on next page.)

Primary Examiner—Christopher Atkinson
(74) Attorney, Agent, or Firm—Michael Best & Friedrich LLP

(57) ABSTRACT

A heat recovery ventilator comprising four rectangular regenerative heat exchangers, two blowers, a rotating air switch all disposed in a compact rectangular housing. The regenerative heat exchangers are stationary with stationary seals between the outside and inside climate. One of the blowers blows a stale airstream out through the heat exchangers; the other blower blows a fresh airstream in through the heat exchangers. The rotating air switch operates in conjunction with the two blowers producing the necessary flow reversal through each regenerative heat exchanger to allow heat and moisture exchange between the stale airstream and the fresh airstream. The rotating air switch is completely on the inside climate side of the regenerative heat exchangers preventing freeze up in cold weather. The rotating air switch uses clearance seals. A high efficiency particulate air filtration filter may be disposed within the housing in the path of the fresh airstream.

17 Claims, 20 Drawing Sheets

U.S. PATENT DOCUMENTS

| | | |
|---|---|---|
| 5,050,667 | 9/1991 | Berner et al. . |
| 5,273,106 | 12/1993 | Drake . |
| 5,339,653 | 8/1994 | DeGregoria . |
| 5,375,649 | 12/1994 | Nilsen et al. . |
| 5,515,909 | 5/1996 | Tanaka . |
| 5,617,913 | 4/1997 | DeGregoria et al. . |

OTHER PUBLICATIONS

"From concept to consumer, Columbus Industries is your single–source solution for custom filters." Columbus Industries, Inc., Ashville, OH (discloses High Efficiency Particulate Air (HEPA) filter) pp. 1–6.

"Lifebreath™ Central Ventilation Systems", Nutech Energy Systems, Inc., London Ontario, Canada (pp. 1–12).

TherMax Energy Recycling Ventilation Systems, "Energy Recycling Ventilation Systems for Improved IAQ", Division of Kooltronic, Inc., Hopewill, New Jersey (34 pages of product information).

Douglas Steege, Altech Energy New Aire™ Air–to–Air Heat Exchanger Ventilators, Madison, Wisconsin (1994) 12 pages (6 sheets).

Honeywell, "The 'Perfect Window' Energy Recovery Ventilator" Product Reference, Golden Valley, Minnesota 9/91 (51 sheets).

Reay, "Heat Recovery Systems A directory of equipment and techniques", E. & F. N. Spon, 1979, pp. 17–35.

Merrill, "Maintaining Your Home", Housing Specialist, University of Wisconsin–Extension—Cooperative Extension (1989) (pp 1–2 on 1 sheet).

"HRV700i" Venmar Ventilation, Inc. © 1995, Saskatchewan, Canada (pp 1–2 on 1 sheet).

"The Fresh Approach to Improved Air Quality" RAYDOT Incorporated, 10–92 10M TH, Cokato, Minnesota (pp 1–4).

"Indoor Air Quality—An Issue That Hits You Where You Live", Guardian™, Broan®, Hartford, Wisconsin, 1993 (pp. 1–12).

"Energy Recovery Wheel", CARNES® Company, Verona, Wisconsin, Catalog HW–01G, Nov. 1989 (pp. 1–12).

"General Product Catalog", CARNES® Company, Verona, Wisconsin, Catalog CG–09K, Jun. 1993 (pp. 1–20).

"Energy Recovery Ventilator", CARNES® Company, Verona, Wisconsin, Catalog HV–01E, Sep. 1991 (pp. 1–14).

"Energy Recover Wheel Systems", CARNES® Company, Verona, Wisconsin, Catalog HS–01E, Apr. 1991 (pp. 1–28).

Merrill, "Is Home Ventilation a Luxury?", Housing Specialist, University of Wisconsin–Extension—Cooperative Extension (1 page).

Indoor Air Pollution, An Introduction for Health Professionals, pp i, I).

"Indoor Air Update—1996 Agenda", College of Agricultural and Life Sciences—University of Wisconsin–Madison (1 page).

"Indoor Air Quality" UW–Extension Family Living (pp 1–2 on 1 sheet).

"Indoor Air Quality Tools for Schools", IAQ Coordinator's Guide, (pp. ii–iv, 1–2).

Merrill et al., "Maintaining Your Home: Lead–Based Paint Hazards", Cooperative Extension Publications, Madison, Wisconsin, Jan. 9, 1995 (pp1–3 and resources sheet).

"Carbon Monoxide", Wisconsin Division of Health, Jan. 1993 (3 sheets).

Chisholm, "Developments in Heat Exchanger Technology–1" National Engineering Laboratory, 1980 (pp. 233–257).

Walker, "Industrial heat exchangers a basic guide", Chemical Engineering, 1983 (pp. 311–321).

"40% Rise Reported in Asthma and Asthma Deaths", *New York Times*, Jan. 6, 1995, (1 page).

"Heat Recovery Ventilation for Housing: Air–to–Air Heat Exchangers", National Center for Appropriate Technology, Butte, Montana, prior to Mar. 1984 (pp. 1–32).

"Major Air Pollutants in the Home" University of Wisconsin–Extension, Cooperative Extension (3 pages on 2 sheets).

Altech Energy (© 1988), New Aire™ Air–to–Air Heat Exchange Ventilators, Madison, Wisconsin (16 sheets).

AIRXCHANGE, "Energy Recovery Ventilation", (Catalog) Rockland, Massachusetts, 1992 (41 sheets).

N.F. Hodgkinson, "Alternatives to Halocarbons in Air Conditioning, Refrigeration and Fire Protection", Australian Refrigeration, Air Conditioning and Heating, Jul. 1990, pp 42–43, 45, 47–48.

FIG. 17B
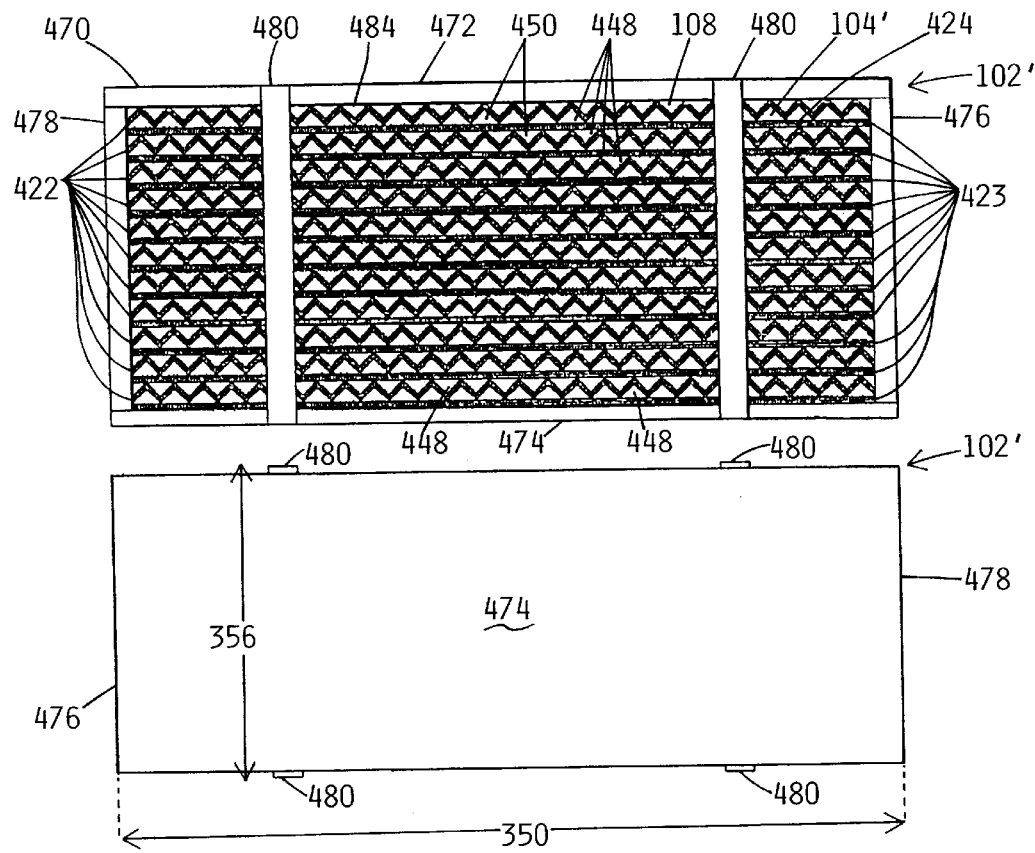
FIG. 17C
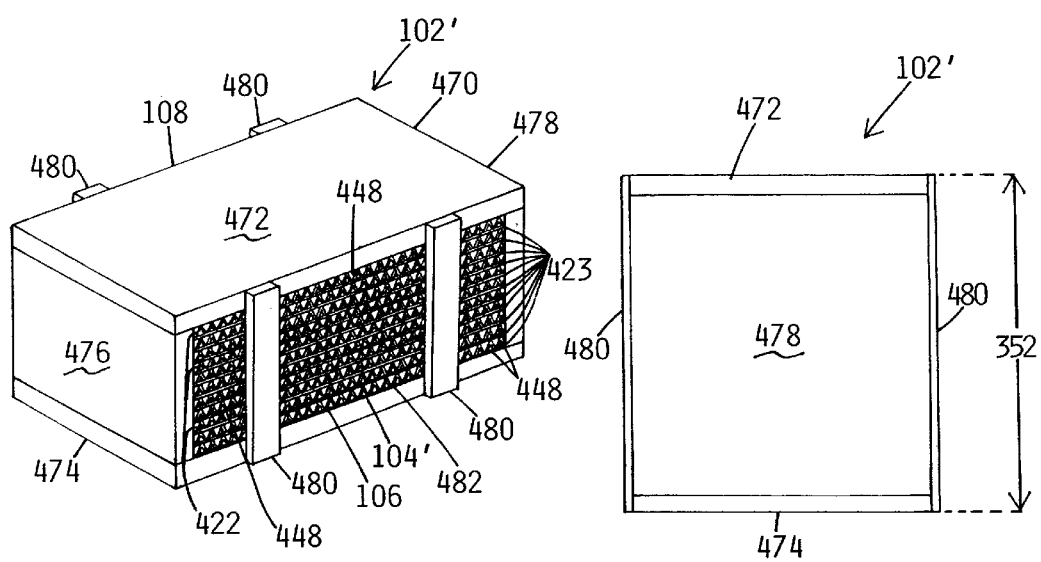
FIG. 17A
FIG. 17D

INTEGRATED HEAT RECOVERY VENTILATOR-HEPA FILTER

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

This invention relates generally to heat transfer devices and air filtration devices, and in particular to heat exchangers, ventilators, and enthalpy exchangers along with air filters. The invention is particularly well-suited for air-to-air heat exchangers utilizing the regenerator principle.

Modern energy efficient construction employs air "tight" structures to restrict infiltration of outside air. Lack of infiltration or natural ventilation has resulted in inadequate indoor ventilation. Standard 62-1989 of American Society of Heating, Refrigeration, and Air conditioning Engineers Inc. (ASHRAE), Atlanta, Ga., states, "When infiltration and natural ventilation are insufficient to meet ventilation air requirements, mechanical ventilation shall be provided. The use of energy recovery ventilation systems should be considered for energy conservation purposes in meeting ventilation requirements." (Sec. 5.1.) Standard 62-1989 suggests 0.35 air changes per hour of continuous fresh air for living areas, but not less than 15 Cubic Feet per Minute (CFM) per person based on design occupancy. For a 2500 square-foot home, this equates to about 120 CFM.

Bringing outside air into a structure for ventilation purpose can be problematic and expensive. Utilizing gas or electric heat to preheat separate ventilation air in winter is inefficient. For example, if the outside air is 20° colder than indoors, approximately 1.2 kW of heat is required to preheat the 120 CFM of required ventilation for a 2500 square-foot home. Use of a heat recovery ventilator is by far the most efficient way to ventilate, exchanging as much as 85% of the heat from warm (inside) exhaust air with the cool fresh air. In summer, use of a heat recovery ventilator also reduces air-conditioning load by exchanging cool dry exhaust air with warm humid fresh air. An "enthalpy" exchanger has been found to be particularly effective in humid climates.

Another problem with bringing in ventilation air concerns the quality of the air. In many places, allergens, such as, pollen or mold spores, and/or other particulates such as soot from vehicle exhaust or emissions from industrial sites, exist in the outside fresh air through much of the year. Filtering these allergens and/or particulates out of the ventilation air is important for severe allergy or asthma sufferers. Air cleaning devices are known which will remove particulates of a certain size. Of particular interest is the High Efficiency Particulate Air (HEPA) filter available from Columbus Industries, Ashville, Ohio. A HEPA filter must capture 99.97% of all particles down to 0.3 micron in diameter.

Some prior art air-to-air heat exchanger technology for home use utilize a cross-flow heat exchanger core, e.g., Lifebreath™ heat recovery ventilator by Nutech Energy Systems, Inc. of London, Ontario, Canada; TherMax TW Model room ventilators made by Thermax Energy Recycling Ventilation Systems, Division of Kooltronic, Inc. of Hopewell, N.J.; NewAire™ air-to-air heat exchange ventilators made by Altech Energy of Madison, Wis.; U.S. Pat. No. 4,512,392 (Van Ee et al.) and U.S. Pat. No. 5,273,105 (Drake). A disadvantage of these devices is low heat exchanger effectiveness. The best theoretical effectiveness is approximately 70% for a cross-flow core. Practically, these devices only achieve a fraction of that effectiveness.

Other prior art technology includes the use of a rotary heat recovery, wheel, e.g., Honeywell "Perfect Window" System energy recovery ventilator, available from Honeywell, Inc. of Golden Valley, Minn. This device employs a rotating regenerative wheel, as well as a fresh air filter and a room air filter. Two types of rotary heat recovery wheels may be used—a desiccant wheel to transfer moisture and also dry heat, or a sensible wheel to transfer only dry heat. (However, as is known in the art, the sensible wheel will transfer moisture when the air drops below the dew point temperature as the air passes through the regenerative wheel.) An advantage of this technology is that high heat exchanger effectiveness is possible. A disadvantage is that it requires an additional moving part, i.e., the regenerative wheel. This regenerative wheel (rotary heat recovery wheel) is approximately 16 inches in diameter for one model. It rotates at about 30 RPM. On one side of the wheel there is outside air. On the other side, there is indoor air. A brush seal is used around the rim of the wheel, and in freezing conditions, warm moist air flowing past the seal will condense and freeze forming frost. If the frost melts, it may migrate to the rim of the wheel and refreeze which can cause the wheel to freeze up. To prevent wheel freeze up, an electric preheater on the incoming air is used to warm the air to 5° F.(−15° C.).

Yet other prior art technology which uses fixed, rotating or reciprocating heat exchanging beds or some method of periodically changing the airflow direction includes U.S. Pat. No. 3,978,912 (Penney et al.); U.S. Pat. No. 4,049,404 (Johnson); U.S. Pat. No. 4,391,321 (Thunberg); U.S. Pat. No. 4,493,366 (Ekman); U.S. Pat. No. 4,589,476 (Berner); U.S. Pat. No. 4,665,805 (Ekman); U.S. Pat. No. 4,688,626 (Tengesdal); U.S. Pat. No. 4,744,409 (Berner); U.S. Pat. No. 4,754,806 (Astle); U.S. Pat. No. 4,815,522 (Thunberg); U.S. Pat. No. 4,952,283 (Besik); U.S. Pat. No. 5,002,116 (Hoagland et al.); U.S. Pat. No. 5,050,667 (Berner et al.); U.S. Pat. No. 5,375,649 (Nilsen et al.) and D. A. Reay, "Heat Recovery Systems"(E.& F. N. Spoon, London, UK, 1979, pp. 17–35).

Most of the present air ventilation/heat recovery technology are large, heavy, bulky devices which are expensive, difficult to install, and complex, sometimes requiring preheating incoming cold air. Not withstanding the many known practical design problems for air-to-air heat exchangers, the art has not responded to date with the production of a compact, lighter weight, air-to-air heat recovery ventilator using a regenerative heat exchanger and not requiring any heater to heat incoming air to avoid freeze-up problems in the heat recovery ventilator, and also not requiring complex rotating seals in the regenerative heat exchanger between an indoor climate and an outdoor climate. The system of the present invention preferably utilizes a HEPA filter to provide high quality ventilation air.

BRIEF SUMMARY OF THE INVENTION

The present invention provides an integrated heat recovery ventilator-HEPA filter utilizing air-to-air regenerative heat exchangers and a fully rotating air switch. A heat recovery ventilator comprises four rectangular regenerative heat exchangers, two blowers, a rotating air switch all disposed in a compact rectangular housing. The regenerative heat exchangers are stationary with stationary seals between the outside and inside climate. One of the blowers blows a stale airstream out through the heat exchangers; the other blower blows a fresh airstream in through the heat exchangers. The rotating air switch operates in conjunction with the two blowers producing the necessary flow reversal through each regenerative heat exchanger to allow heat and moisture exchange between the stale airstream and the fresh airstream. The rotating air switch is disposed completely on the inside (indoor) climate side of the regenerative heat exchangers preventing freeze up in cold weather. The rotating air switch uses clearance seals. A high efficiency particulate air filtration filter may be disposed within the housing in the path of the fresh airstream. The system of the present invention provides a high performance, low cost, compact, lighter weight air-to-air heat recovery ventilator using a regenerative heat exchanger and not requiring any heater to heat incoming air.

The foregoing, and other advantages of the present invention, are realized in one aspect thereof in a heat recovery ventilator for use in ventilating a room, or the like, having means for venting a stale airstream of an indoor climate to the outside air, means for supplying a fresh airstream from the outside air of an outside climate, at least two stationary regenerative heat exchangers and a rotating air switch for transferring the stale airstream to the regenerative heat exchangers from the means for venting the stale airstream of the indoor climate and for transferring the fresh airstream of the outside climate from the regenerative heat exchangers to the means for supplying a fresh airstream from the outside air of the outside climate, the rotating air switch being rotatably mounted and comprising a first circular side plate having an air flow opening therein, a second circular side plate having a pair of air flow openings with the second plate spaced apart and disposed opposed and parallel to the first side plate, and a single manifold. The manifold extends from the air flow opening in the first side plate to one of the pair of the air flow openings in the second side plate. The manifold encloses the air flow opening in the first side plate and one of the pair of air flow openings in the second side plate and forms a passage way for moving the fresh airstream from the regenerative heat exchangers to the means for supplying the fresh airstream from the outside air of the outside climate. The other opening in the second side plate forms a stale air passageway for transferring the stale airstream from the means for venting the stale airstream of the indoor climate to the regenerative heat exchangers, such that air flows in opposite directions through the same regenerative heat exchanger. The air switch is isolated from the outside climate by the regenerative heat exchangers. The heat recovery ventilator further comprises a plurality of noncontacting clearance seals with one of the noncontacting clearance seals disposed between the first circular plate of the rotating air switch and both the means for venting the stale airstream and the means for transferring the fresh airstream, and the remaining noncontacting clearance seals disposed between the second circular plate and the stationary regenerative heat exchangers. There are four regenerative heat exchangers. The regenerative heat exchangers are elastomer beds. The heat recovery ventilator further comprises a filter, wherein the filter is disposed so that the fresh airstream flows through said filter before entering the room. The filter captures at least 99.97% of particles in the fresh airstream having a diameter greater than 0.3 microns.

In yet another aspect, the invention is a heat recovery ventilator for use in a room or the like, comprising a housing, two blowers, at least two stationary regenerative heat exchangers, a shaft, a single rotating air switch, mounted on the shaft, a motor for driving the blowers and the shaft, with one of the blowers for forcing a stale airstream out of the room and the other of the blowers for forcing a fresh airstream into the room. The air switch, in use, alternately imparts the stale airstream from one blower to a regenerative heat exchanger, then imparts the fresh airstream to that same heat exchanger and through the other blower, when the air switch rotates in a 180° turn. The rotating air switch of the heat recovery ventilator air switch has a first side plate having an opening and having a center shaft aperture, a second side plate having two openings spaced from each other, and a center shaft aperture, a single manifold extending from the first side plate to the second side plate, wherein the manifold connects the opening of first side plate with one of the openings in said second side plate forming a fresh air passageway, and a shaft receiving portion extending from the first side plate to the second side plate; wherein the rotating switch is disposed upon the shaft. The shaft is disposed in the shaft receiving portion.

In use, the fresh airstream flows from the regenerative heat exchangers through the fresh air passageway and is forced out by the other blower. The second opening of the second side plate along with a portion of the manifold and a portion of the shaft receiving portion form a stale air passageway from the one blower to the regenerative heat exchangers, for transferring the stale airstream to the regenerative heat exchangers. The housing of the aforementioned heat recovery ventilator has first compartment containing the one blower, a second compartment containing the other blower, a third compartment containing the rotating air switch, and a fourth compartment containing the regenerative heat exchangers. The first compartment has a plurality of openings therein for forcing the stale airstream to flow into the housing and through the blower. The second compartment has a plurality of openings therein for permitting the fresh airstream to exit the housing and to enter the room. The fourth compartment has a plurality of openings therein for forcing the stale airstream out of the fourth compartment and for allowing the fresh airstream to be drawn into the fourth compartment.

The first compartment is next to the second compartment and shares a common blower bulkhead. The third compartment is adjacent to both the first compartment and the second compartment and shares a common motor bulkhead with the first compartment and the second compartment. The motor bulkhead has a first opening into the first compartment and a second opening into the second compartment. The fourth compartment is spaced from the first and second compartments and is adjacent to the third compartment. The fourth compartment shares a common regenerator bulkhead with the third compartment. The regenerator bulkhead has an opening therein. The rotating air switch is disposed in the third compartment with one end of the rotating air switch adjacent the opening in the regenerator bulkhead and the other end of the rotating air switch adjacent the opening in the motor bulkhead between the second and third compartments.

In a further aspect, the invention provides a rotating air switch for use in a heat recovery ventilator used in a room or the like, the heat recovery ventilator of the type having a housing, a first blower, a second blower, at least two stationary regenerative heat exchangers, a shaft for mounting the air switch upon, a motor for driving the blowers and the shaft, the first blower for forcing a stale airstream out of the housing; the second blower for forcing a fresh airstream into the housing, and the rotating air switch. The rotating air switch comprises a first side plate having an opening and having a center shaft aperture, a second side plate having two openings spaced from each other, and a center shaft aperture, a shaft receiving portion extending from the first side plate to the second side plate and connecting the center shaft apertures, a single manifold extending from the first side plate to the second side plate, the manifold connecting the opening on the first side plate with one of the openings in the second side plate and forming a fresh air passageway there between. The other of the opening of the second side plate along with a portion of the manifold and a portion of the shaft receiving portion forms a stale air passageway from the first blower to the regenerative heat exchanger. Wherein in use, the rotating air switch alternately imparts the stale airstream from the first blower to a regenerative heat exchanger, then imparts the fresh airstream to that same regenerative heat exchanger. The opening on the first side plate and the two openings of said second side plate are each pie shaped. The opening on the first side plate and the two openings of said second side plate each subtend an angle of about 90°. The manifold is pie shaped. The opening on the first side plate, each of the two openings of the second side plate and the manifold are each pie shaped. The opening on the first side plate and the two openings of the second side plate subtend an angle of about 90° and the two openings of the second side plate are spaced about 90° apart. When the rotating air switch is disposed upon the shaft and travels through a 180° rotation, the fresh airstream flows from the regenerative heat exchangers through the fresh air passageway and is forced out of the housing by the second blower, and the first blower forces the stale airstream through the stale air passageway and into the same regenerative heat exchangers.

In a still further aspect, the invention provides a housing for a heat recovery ventilator having a single rotating air switch having a pair of opposing side plates, a plurality of regenerative heat exchangers, a fresh air blower, a stale air blower, a motor for driving the blowers and the air switch, the housing comprises: a first compartment containing a stale air blower, a second compartment containing the fresh air blower and the motor, a third compartment generally parallel to and adjacent to both the first and second compartments, and a fourth compartment generally parallel to and adjacent to the third compartment.

The first compartment has a plurality of openings therein for providing for a stale airstream from an indoor climate to flow into the first compartment. The second compartment is adjacent to the first compartment. The second compartment has a plurality of openings therein for providing for a fresh airstream to flow out of the second compartment and into the indoor climate. The third compartment contains the rotating air switch. The first and third compartments have a common opening therebetween for the stale airstream to flow from the first compartment into the third compartment and then into a stale air passageway in the rotating air switch. The third compartment has a common opening to the second compartment disposed in communication with an opening in one of the opposing side plates of the rotating air switch. The fourth compartment is generally parallel to and spaced from both the first and second compartments by the third compartment. The fourth compartment contains the regenerative heat exchangers. The fourth compartment has a common opening to the third compartment through which the other opposing side plate of the rotating air switch is in communication. The fourth compartment has a plurality of openings permitting the fresh airstream to flow into the regenerative heat exchangers from an outdoor climate and the stale airstream to flow out of the regenerative heat exchangers into the outdoor climate. The housing further comprises a fifth compartment, generally parallel to and adjacent to the first and second compartments. The fifth compartment has a plurality of openings therein, and bears a particulate filter therein, wherein the fresh airstream exits the second compartment and enters the fifth compartment traveling through the filter and exits through the openings in the fifth compartment.

In yet another aspect, the invention provides a method of providing indoor ventilation using a heat recovery ventilator having stationary rectangular regenerative heat exchangers, two blowers, one rotating air switch, a motor for driving the blower and air switch, all disposed in a housing, the housing having stale air openings for allowing a stale airstream to enter the housing and fresh air openings for allowing fresh air to exit from said housing. The method comprising the steps of: (a) forcing a stale airstream from an indoor climate into the housing, (b) blowing the stale airstream into the rotating air switch, (c) transporting the stale airstream from the rotating air switch into the stationary rectangular regenerative heat exchangers, (d) simultaneously exchanging heat and moisture from the stale airstream onto the regenerative heat exchangers and forcing the stale airstream to flow out of the housing, (e) forcing fresh air into the housing and through the same regenerative heat exchangers, (f) exchanging heat and moisture on the regenerative heat exchanger into the fresh airstream, (g) forcing the fresh airstream which is heated and moisturized into the rotating air switch and through the fresh air blower, and (h) forcing the fresh airstream which is heated and moisturized out of the housing and into the indoor climate. The rotating air switch used in the present method includes a first side plate having an opening and having a center shaft aperture, a second side plate having two openings spaced from each other, and a center shaft aperture, a shaft receiving portion extends from the first side plate to the second side plate and connects the center shaft apertures, a single manifold extends from the first side plate to the second side plate. The manifold connects the first side plate opening with one of the openings in the second side plate and forms a fresh air passageway there between, while the other opening of the second side plate along with a portion of the manifold and a portion of the shaft receiving portion form a stale air passageway from the first blower to the regenerative heat exchanger. The method further comprises in step (b) blowing the stale airstream into the stale air passageway, in step (c) transporting the stale airstream from the stale air passageway in the rotating air switch into the stationary regenerative heat exchangers, and in step (g) forcing the fresh airstream into the fresh air passageway in the rotating air switch and through the fresh air blower.

The method further comprises the step of providing a particulate filter to the housing and filtering the airstream prior to step (h).

Other advantages and a fuller appreciation of the specific attributes of this invention will be gained upon an examination of the following drawings, detailed description of preferred embodiments, and appended claims. It is expressly understood that the drawings are for the purpose of illustration and description only, and are not intended as a definition of the limits of the invention.

BRIEF DESCRIPTION OF THE DRAWING(S)

The preferred exemplary embodiment of the present invention will hereinafter be described in conjunction with the appended drawing wherein like designations refer to like elements throughout:

Figure 1:
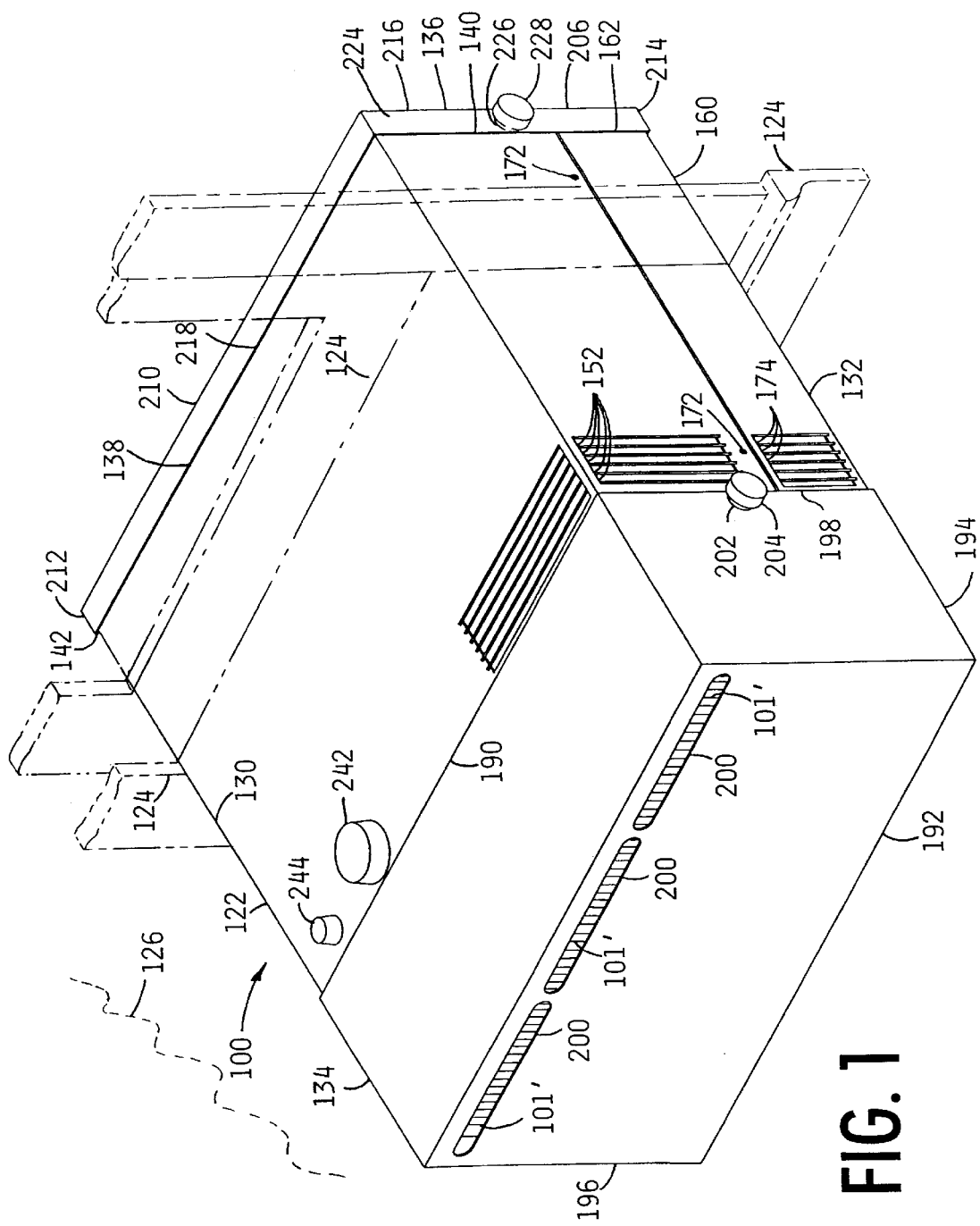
FIG. 1 is a perspective view of a first embodiment of heat recovery ventilator of the present invention, seen from within the room of the structure, and with phantom lines showing the present invention positioned in a window, opening to the outdoor climate.
Figure 8:
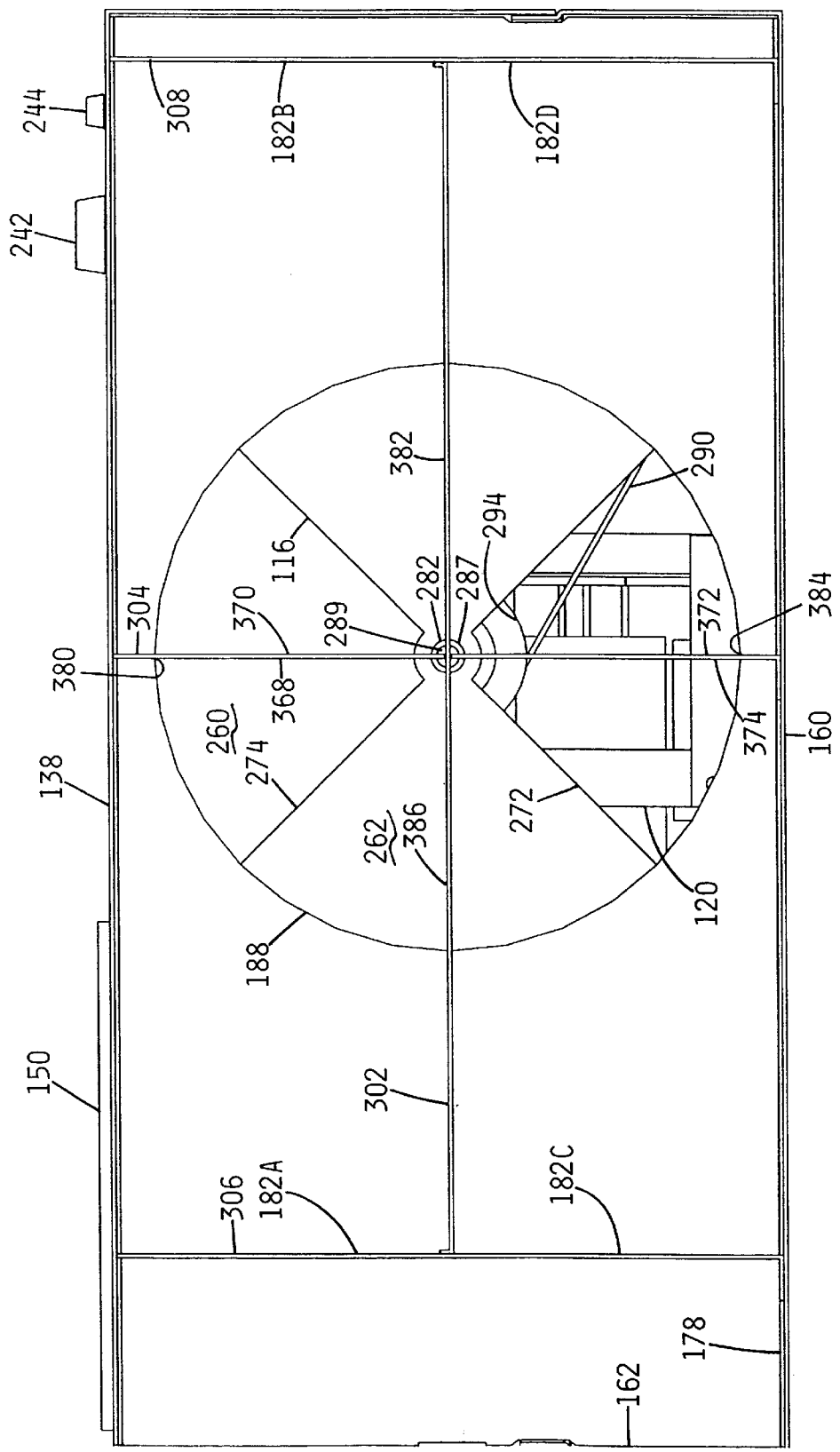
FIG. 8 is a front view of the exterior side of the present invention with the exterior cover removed and with the regenerative heat exchangers and sealing materials removed, illustrating the travel of the rotating air switch through the regenerator manifolds.
Figure 12:
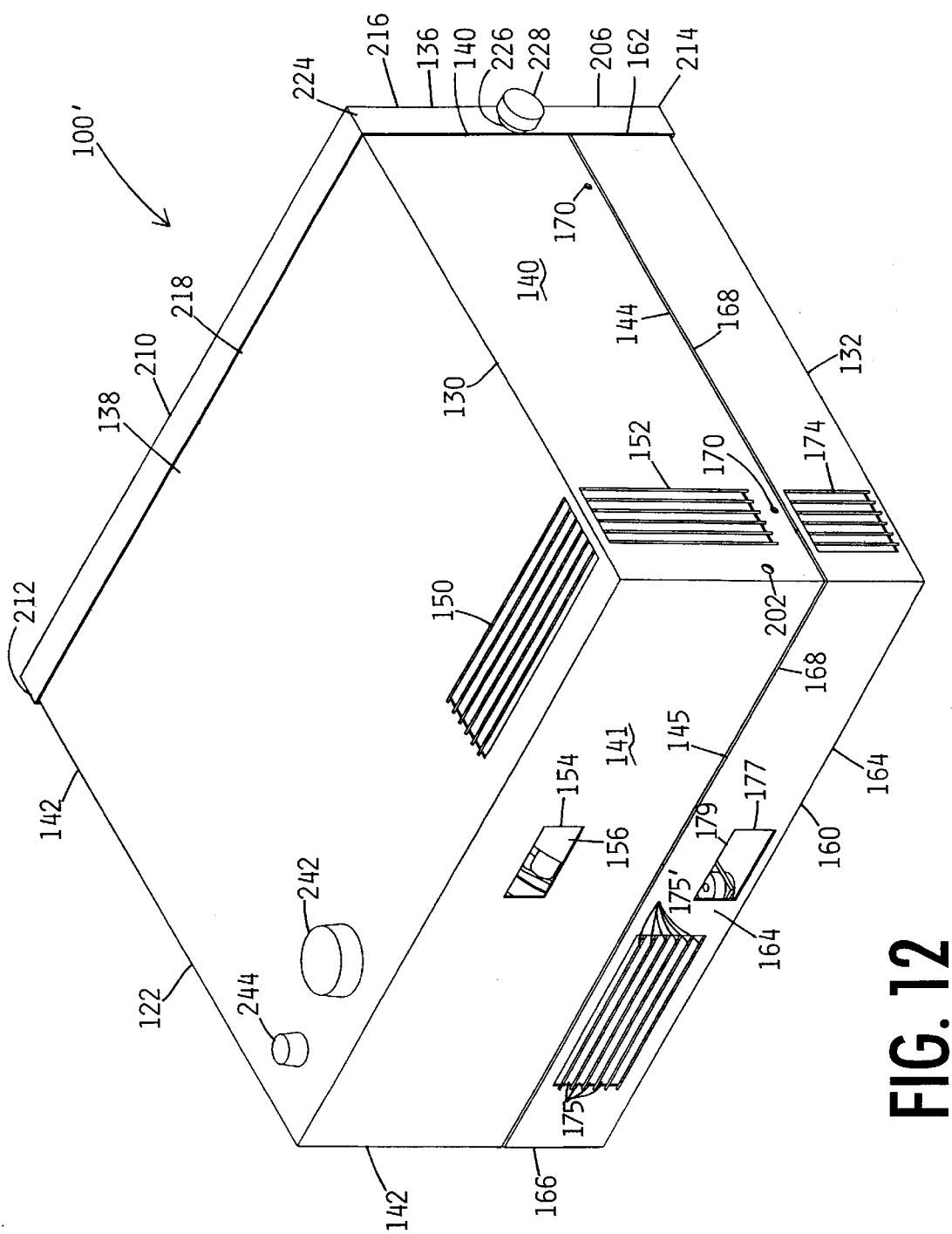
FIG. 12 is a perspective view of a second embodiment of the present invention without the HEPA filter assembly and without the interior cover.

FIGS. 16A–16D are schematic perspective views for either embodiment of FIG. 1 or FIG. 12 illustrating the fresh air flow and the stale air flow through the regenerator bulkheads containing the elastomer beds as the rotating air switch travels in a 360° full rotation, beginning with the position of the rotating air switch as shown in FIG. 8, with the elastomer beds, sealing materials and the exterior cover removed; and FIGS. 17A–17D are, respectively, a perspective view, a rear plan view (the front plan view being identical thereto), a bottom plan view (the top plan view being identical thereto) and right side view (the left side view being identical thereto) of an alternate regenerative heat exchanger for use in either embodiment of FIG. 1 or FIG. 12; the alternate regenerative heat exchanger having alternating layers of flat materials and corrugated materials in which heat and moisture exchange occurs.

DETAILED DESCRIPTION OF THE INVENTION

The present invention relates broadly to regenerative air-to-air heat exchangers, regenerative air-to-air enthalpy exchangers, and HEPA filters.

Figure 13:
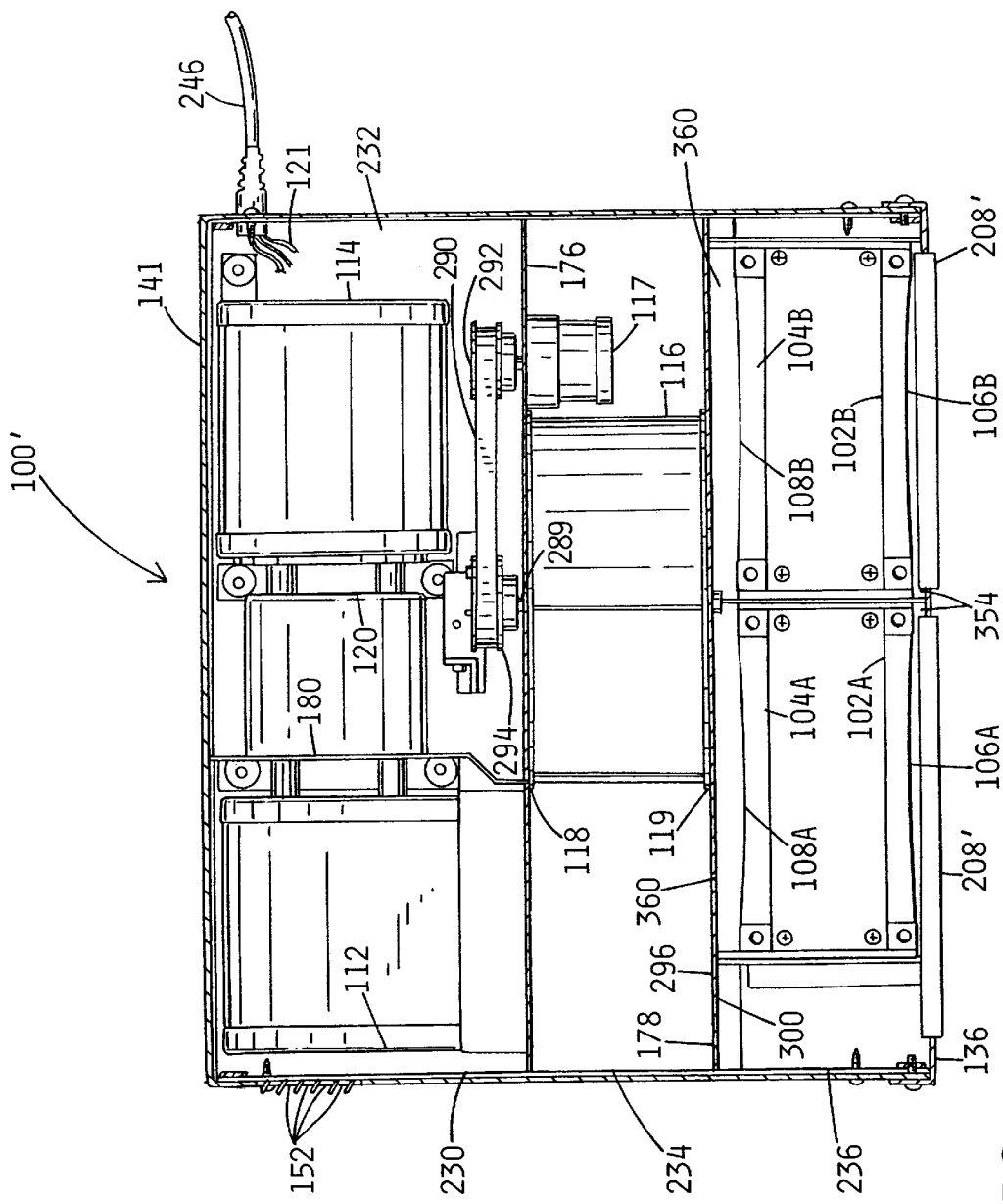
FIG. 13 is a top schematic view of the embodiment of FIG. 12 illustrating the interior of the four compartments comprising thereof, with upper casing top wall, a portion of the exterior cover, and a portion of the sealing materials removed.

FIGS. 1–11, 14, 15A, 15B and 16A–16D illustrate a first embodiment of an integrated heat recovery ventilator (HRV) 100 of the present invention using a HEPA filter assembly 101. FIGS. 12–13 illustrate a second embodiment HRV 100' of the present invention without a HEPA filter assembly 101 and an interior cover 134. HRVs 100 and 100' are identical in all other aspects of the invention, and hence the same numbering will be used on the same elements on each embodiment throughout this description. FIGS. 17A–17D illustrate an alterative regenerative heat exchanger for HRVs 100 and 100'.

HRV 100 and 100' are particularly well-suited for use in small to medium sized building structures such as homes, apartments, condominiums, restaurants, taverns, small shops, and rooms thereof, etc. The general construction of HRV 100, 100' preferably utilizes four identically dimensioned and constructed regenerative heat exchangers 102A, 102B, 102C, 102D. The regenerative heat exchangers 102A–102D each have a heat exchange matrix 104A–104D, respectively. Each heat exchange matrix 104A–104D is made of heat exchanger materials in which heat and moisture exchange occurs. The regenerative heat exchangers 102A–102D are most preferably rectangular beds made of elastomer materials, made according to the disclosure in U.S. Pat. Nos. 5,339,653 and 5,617,913, the disclosures of which are hereby incorporated by reference.

The regenerative heat exchangers 102A–102D, each also have a respective outside side or face 106A–106D which faces the outside climate, e.g., the outside outdoor fresh air, and a respective opposite inside side or face 108A–108D facing the inside (indoor) climate, e.g., the indoor stale air of a room. The regenerative heat exchangers 102A–102D are stationary with stationary seals 354 between the outside climate side 106A–106D and inside climate side 108A–108D. HRV includes two blowers 112, 114; blower 112 blows stale air out of the structure through the regenerative heat exchangers 102A–102D. Blower 114 blows fresh outdoor air in through the regenerative heat exchangers 102A–102D. Since the regenerative heat exchangers 102A–102D are "regenerative", stale air flows out of any one of them for a finite period of time when the flow is reversed and fresh air flows in the opposite direction. In this way, heat and moisture in the stale air, which is deposited on the heat exchange matrix 104A–104D, is imparted to the cold dry fresh air. A separate rotating air switch 116 operating in conjunction with blowers 112, 114, produces the necessary air flow reversal; thus, blower 112 is a stale air blower and blower 114 is a fresh air blower. A conventional commercially available gear motor 117 drives the rotating air switch 116. The gear motor 117 is an assembly combining both a conventional electric motor (not shown) and a gear box (not shown). The rotating air switch 116 is located completely on the inside (indoor) climate side 108A–108D of the regenerative heat exchangers 102A–102D and thus isolated from the outside climate. Advantageously, this unique location of the rotating air switch 116, plus the use of regenerative heat exchangers 102A–102D in the HRV 100, 100', prevent the possibility of freeze-up of the rotating air switch 116 in cold weather. Also, the rotating air switch 116 preferably uses noncontacting clearance seals 118, 119, thus there is no wear problem. A conventional electric motor 120 is used to operate the blowers 112, 114 of the HRV 100, 100'. Suitable conventional electrical components 121 are used to convey electrical power to the device. A compact rectangular cover or housing 122 encloses the rectangular regenerative heat exchangers 102A–102D, the stationary seals 354, the stale air blower 112, the fresh air blower 114, the rotating air switch 116, the gear motor 117, the clearance seals 118, 119, the electrical motor 120 and the optional HEPA filter assembly 101.

Reference is now made specifically to FIG. 1, wherein the first embodiment of the integrated heat recovery ventilator 100 is shown mounted in a window opening 124 in a room of a structure 126. The window opening 124 and room of structure 126 are illustrated in phantom lines. FIG. 1 shows HRV 100 of the present invention as viewed from the interior of the room in which the invention is used. As used herein, "interior" refers to that side of the HRV 100 (or 100') which typically faces the interior (indoor side) of the structure being ventilated, and outside or "exterior" refers to that side of the HRV which typically faces the outside of the structure 126 being ventilated (outdoor climate). HRV 100 (or 100') may be mounted in a window 124 or through an opening in an exterior wall (not shown) of a room of a structure 126.

Figure 2A:
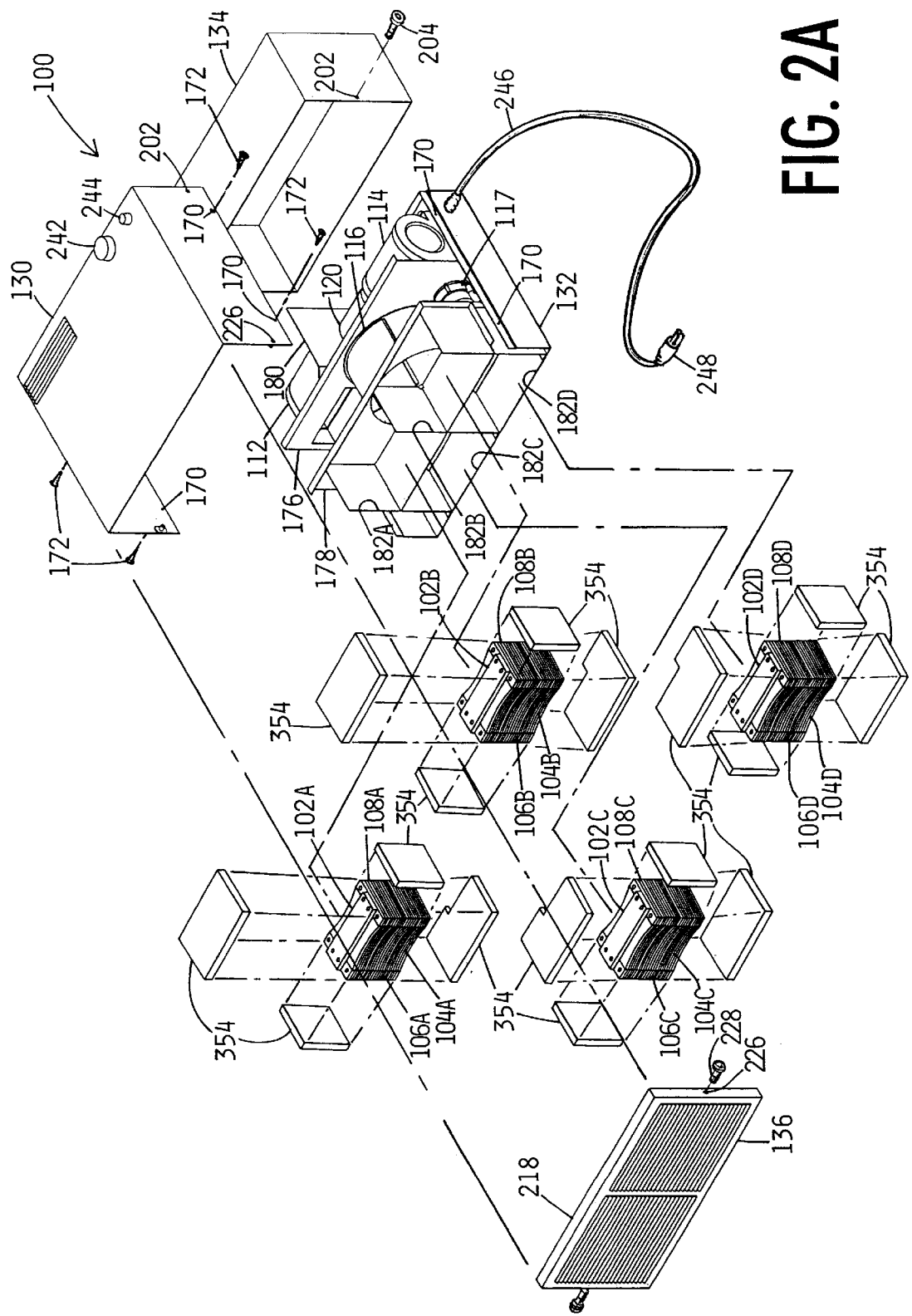
FIG. 2A is a partially exploded view of the device of FIG. 1 rotated 180°, and without a filter assembly in the interior cover.
Figure 2B:
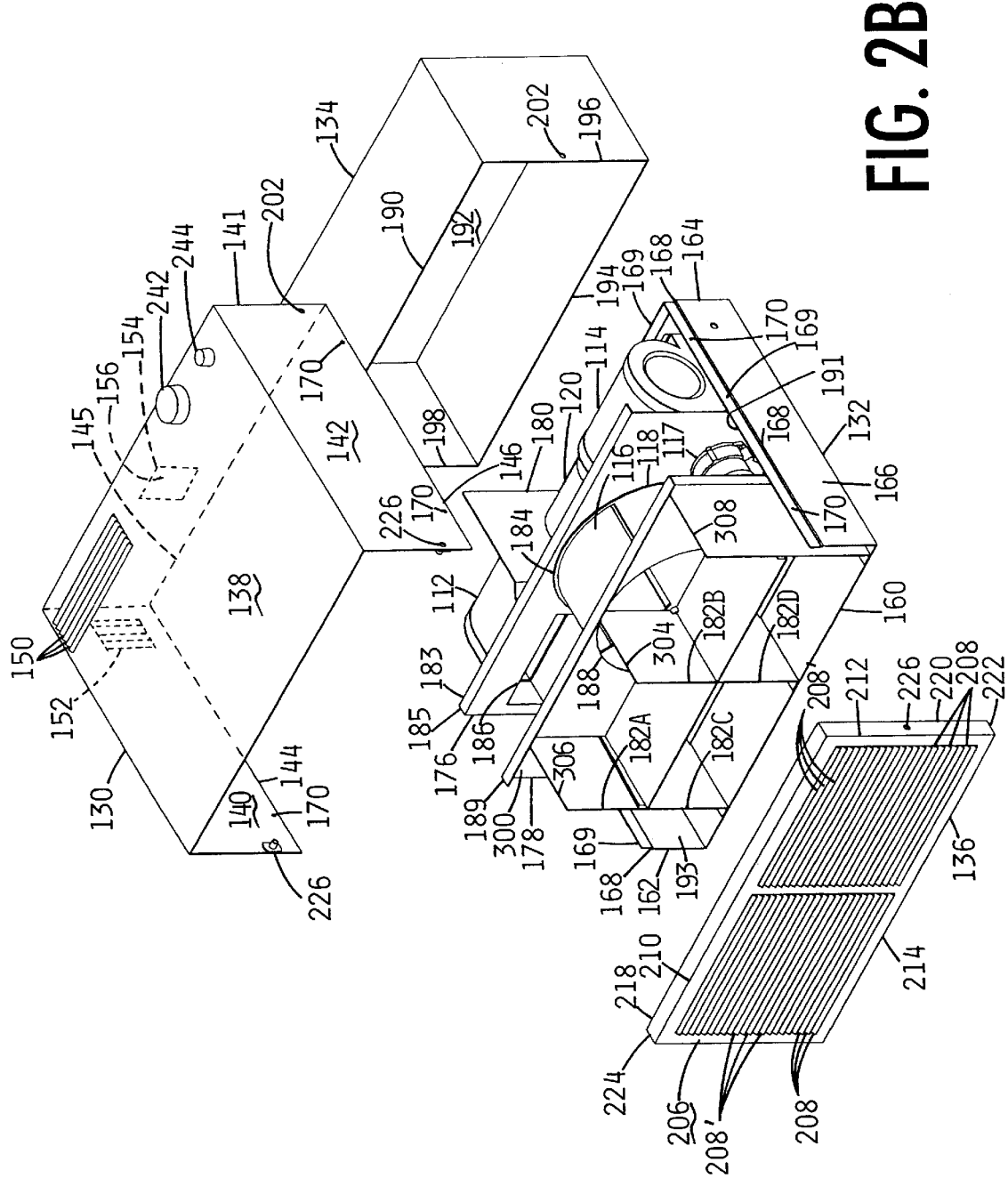
FIG. 2B is an enlarged partial view of FIG. 2A, with phantom lines showing the side walls of the upper casing.

As best shown in FIGS. 1, 2A and 2B, the rectangular housing 122 of HRV 100 has four housing portions when the HEPA filter assembly 101 is used: an upper casing 130, a lower casing 132, an "interior" cover 134 and an "exterior" cover 136 which are fastened together. Likewise, as shown in FIGS. 12 and 13, HRV 100' has three housing portions: upper casing 130, the lower casing 132, and the exterior cover 136 which are fastened together.

Upper casing 130 has a generally rectangular top wall 138 and three downwardly depending side walls 140, 141, 142, respectively. Side walls 140, 141, 142 terminate in side wall edges 144, 145, 146 respectively. Side walls 140, 142 are disposed as an opposed pair, with side wall 141 extending between side walls 140, 142 and generally perpendicular to them. Top openings 150 are disposed on the top wall 138 of the upper casing 130. Side openings 152 are disposed on the side wall 140 near the top openings 150. An upper casing window 154 is disposed in side wall 141. Window 154 is sealed with a clear plastic piece 156.

Figure 3:
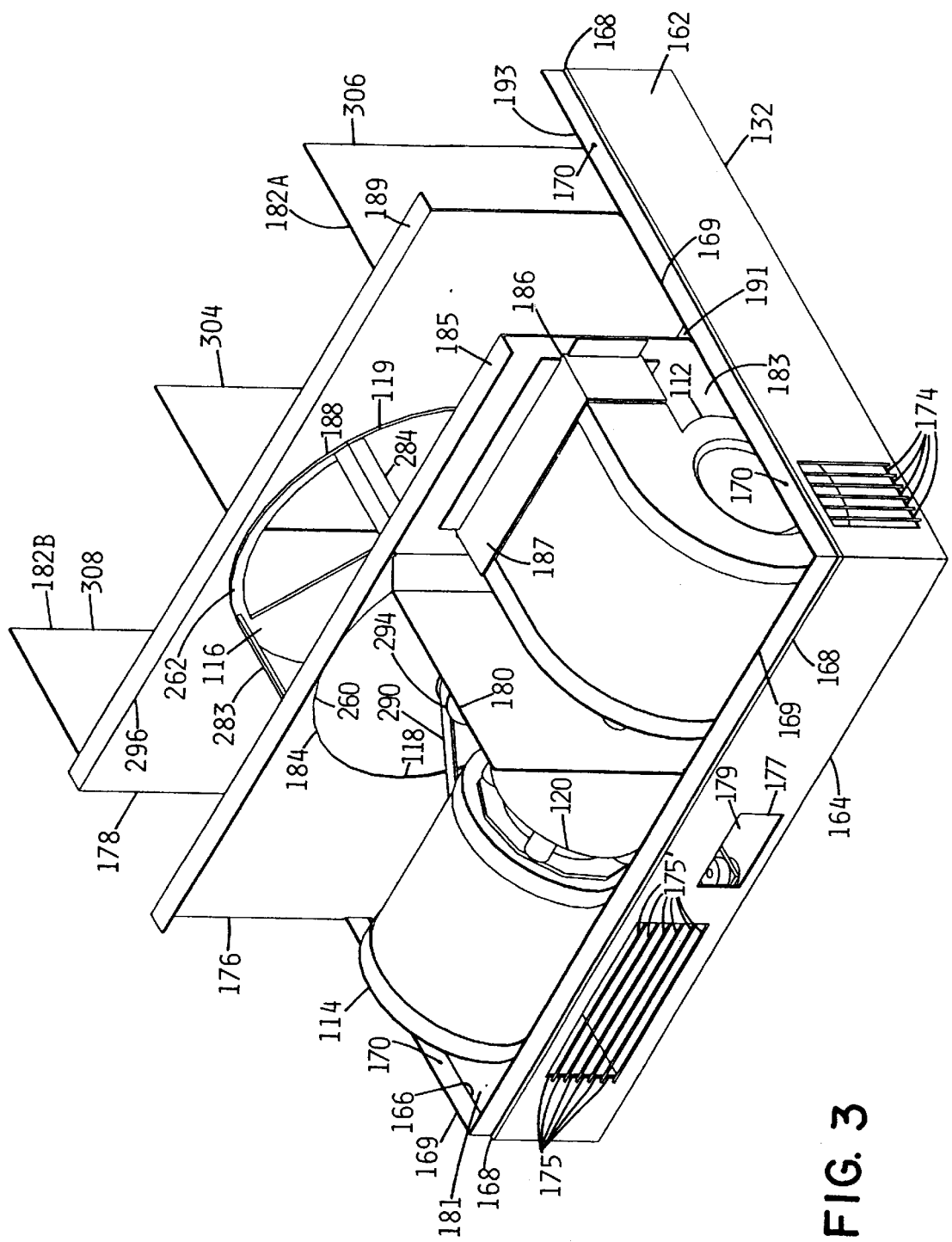
FIG. 3 is an enlarged perspective view of the lower casing and assembled compartments of FIG. 2B from the opposite direction with the regenerative heat exchangers removed from the regenerator manifolds.
Figure 4:
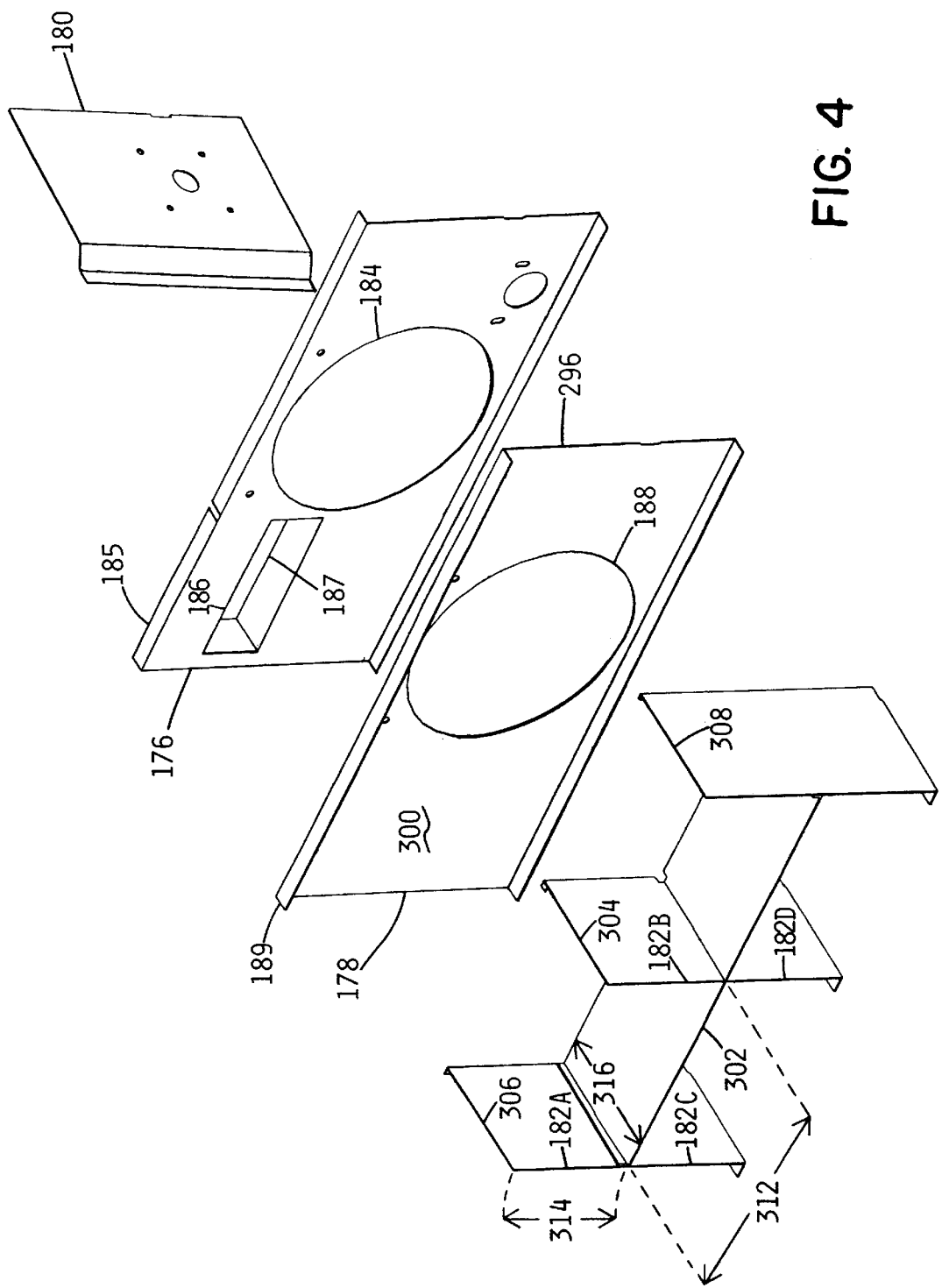
FIG. 4 is an exploded enlarged perspective view of the bulkheads of the present invention.
Figure 5:
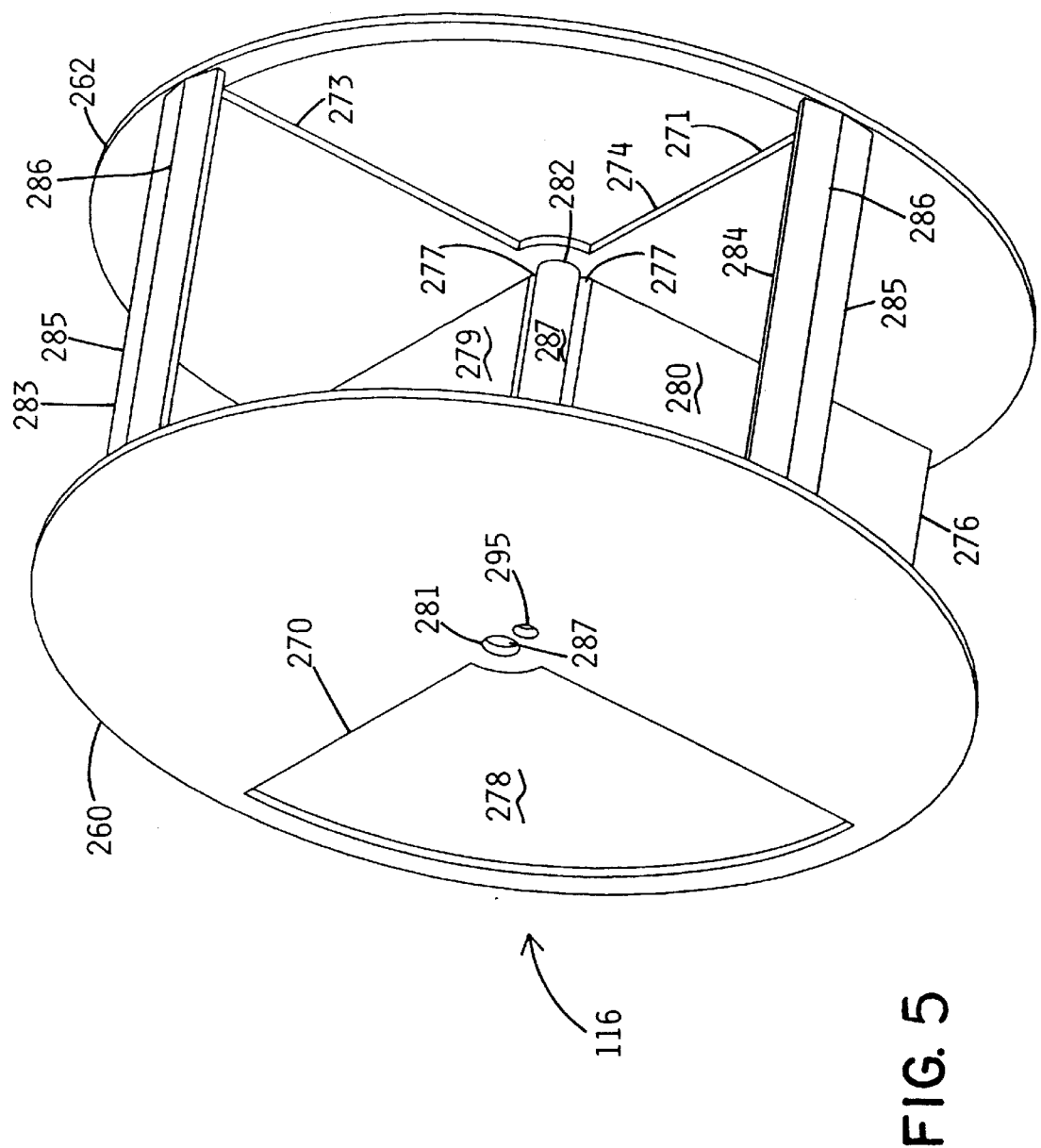
FIG. 5 is an enlarged perspective view of the rotating air switch of the present invention as seen from one side.
Figure 6:
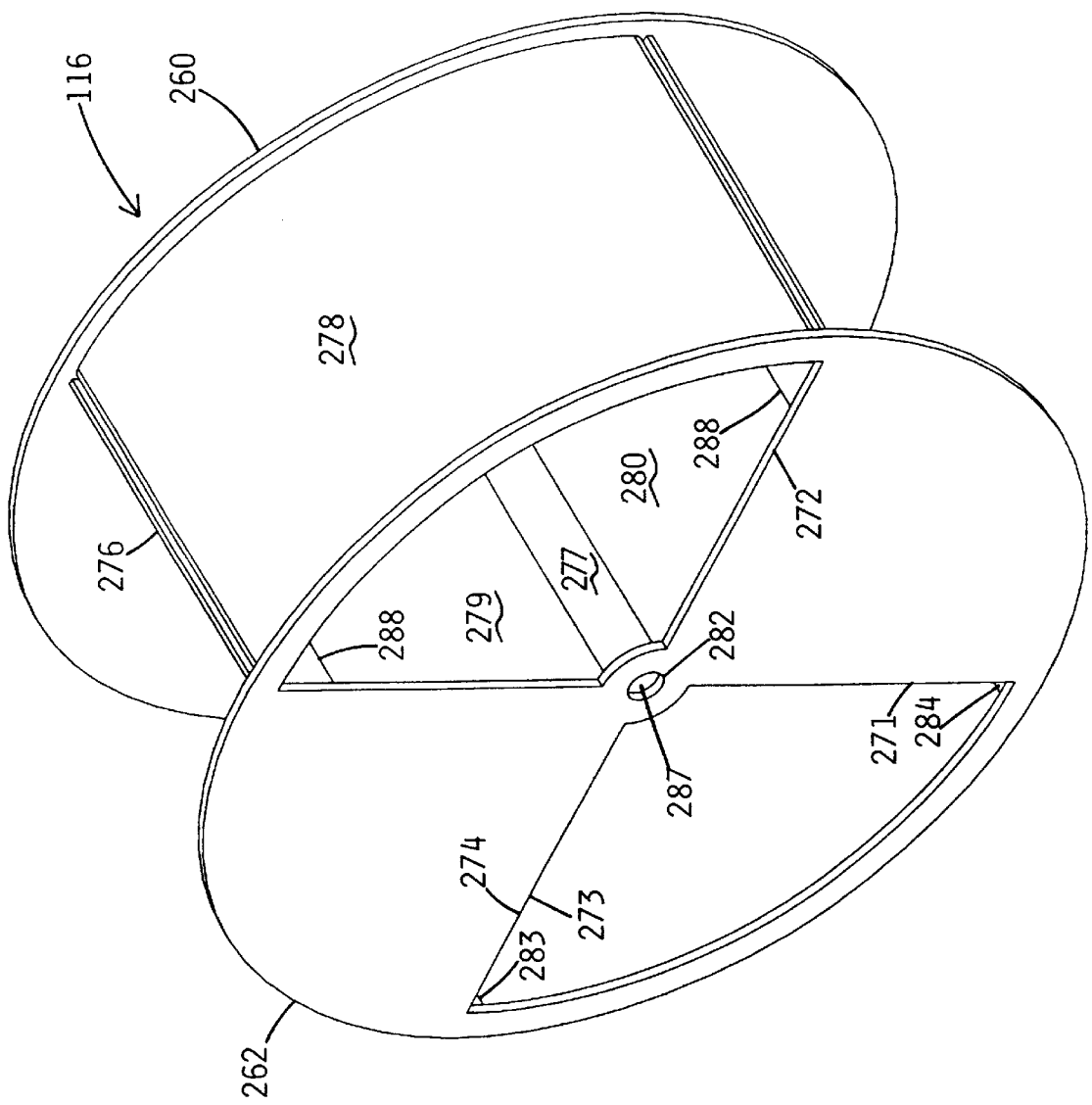
FIG. 6 is a view of the rotating air switch of FIG. 5, as seen from the other side.

The lower casing 132 has a bottom wall 160 and three side walls 162, 164, 166 extending upwardly from the bottom wall 160. The side walls 162, 164, 166 form a ledge 168. A lip 169 extends upwardly from the ledge 168. Side walls 162, 166 are disposed as an opposed pair with side wall 164 extending between them and generally perpendicular to them. Side walls 162, 164, 166 are dimensioned to permit the side wall edges 144, 145, 146 of the upper casing 130 to rest on the ledge 168 above each and abut against lip 169. Openings 170 are suitably arranged on the side walls 140, 142, 162, 166 and on lip 169 above side walls 162, 166 to allow the attachment of the upper casing 130 to the lower casing 132 using conventional fasteners 172, such as hardware screws. As is best shown in FIG. 3, side openings 174 are disposed in the side wall 162. The mounting of the HRV 100 (or 100') in an opening or the window 124 in the room of the structure 126 must allow the side openings 152, 174 and top openings 150 to be physically inside the structure 126. Preferably openings 150, 152, 174, are louvered, however other suitable openings such as elongated or slotted openings, or grill type openings may be used as is known by those skilled in the art.

Openings 175 are disposed in side wall 164 near side wall 166. Proximate openings 175 is a lower casing window 177 which is sealed with a clear plastic piece 179. The window 154 is disposed directly above the window 177 when the upper casing 130 is attached to the lower casing 132. Preferably openings 175 are louvered openings with a louver 175' directed upwardly to channel air toward the ceiling of a room in which the device HRV 100, 100' is used. When the device HRV 100 (or 100') is operated without an automatic frost protection or a defrost cycle, one may check for any frost build-up occurring on the regenerative heat exchangers 102A–102D by viewing them through windows 154 and 177.

The lower casing 132 contains the stale air blower 112, the fresh air blower 114, the motor 120 for controlling blowers 112, 114, the rotating air switch 116, the gear motor 117, conventional electronics for driving the gear motor (not shown), miscellaneous wiring for the motors 120, 117, blowers 112, 114, and air switch 116, a motor bulkhead 176, a regenerator bulkhead 178, a blower bulkhead 180, a plurality of regenerator manifolds 182A–182D and an equal number of regenerative heat exchangers 102A–102D.

The lower casing 132 is divided into four large compartment sections. A first section 181 and a second section 183 are created by the arrangement of the blower bulkhead 180 and the motor bulkhead 176. The blower bulkhead 180 is disposed between the fresh air blower 114 and the stale air blower 112 and serves to isolate each blower from the other. The motor 120 and means for driving the gear motor 117 are suitably adjacent to the fresh air blower 114 and on the same side of the blower bulkhead 180 as the fresh air blower 114. The motor bulkhead 176 is disposed generally parallel to side wall 164 and in contact with blower bulkhead 180. Thus, the first compartment section 181 contains the fresh air blower 114, motor 120, and means for driving the gear motor, and the second section 183 contains the stale air blower 112. The motor bulkhead 176 has a large circular opening 184 adjacent to and almost abutting a side plate 260 of the rotating switch 116 and a separate stale air opening 186 for communicating with the stale air blower 112. The circular opening 184 is disposed to communicate with the fresh air blower 114. A baffle 187 sealingly connects stale air blower 112 to stale air opening 186 in the motor bulkhead 176. Circular opening 184 is preferably smaller in diameter than diameter of side plate 260.

The regenerator bulkhead 178 is spaced from the motor bulkhead 176 and is oriented generally parallel to it forming a third compartment section 191. The third compartment section 191 is sufficiently dimensioned to permit the interposition of the rotating air switch 116 between motor bulkhead 176 and the regenerator bulkhead 178. The regenerator bulkhead 178 has a large circular opening 188 adjacent to and almost abutting an opposite side plate 262 of the rotating air switch 116. Circular opening 188 is preferably smaller in diameter than diameter of side plate 262. Circular openings 184 and 188 and side plates 260 and 262 are preferably concentric. The gear motor 117 for driving the rotating air switch 116 is also disposed in the third section 191.

A fourth compartment section 193 defines the space occupied by the regenerator manifolds 182A–182D on the side of the regenerator bulkhead 178 opposite the rotary air switch 116. The interrelation of these elements of the HRV 100, 100' will be discussed after the discussion of the interior cover 134 and the exterior cover 136.

The motor bulkhead 176, the regenerator bulkhead 178, and the blower bulkhead 180 are suitably dimensioned to contact the top wall 138 when the upper casing 130 is fastened to the lower casing 132. Preferably, the motor bulkhead 176 and the regenerator bulkhead 178 each have flanges 185, 189, respectively, which abut the top wall 138 when the upper casing 130 and lower casing 132 are fastened.

As best shown in FIGS. 1, 2A, 2B and 11, the interior cover 134, used in embodiment HRV 100, has five walls: an interior cover top wall 190, an interior cover end wall 192, an interior cover bottom wall 194 and a pair of opposed interior cover side walls 196, 198. A plurality of air exits 200 are disposed on the interior cover end wall 192 near the interior cover top wall 190. The interior cover preferably houses the HEPA filter assembly 101.

Figure 11:
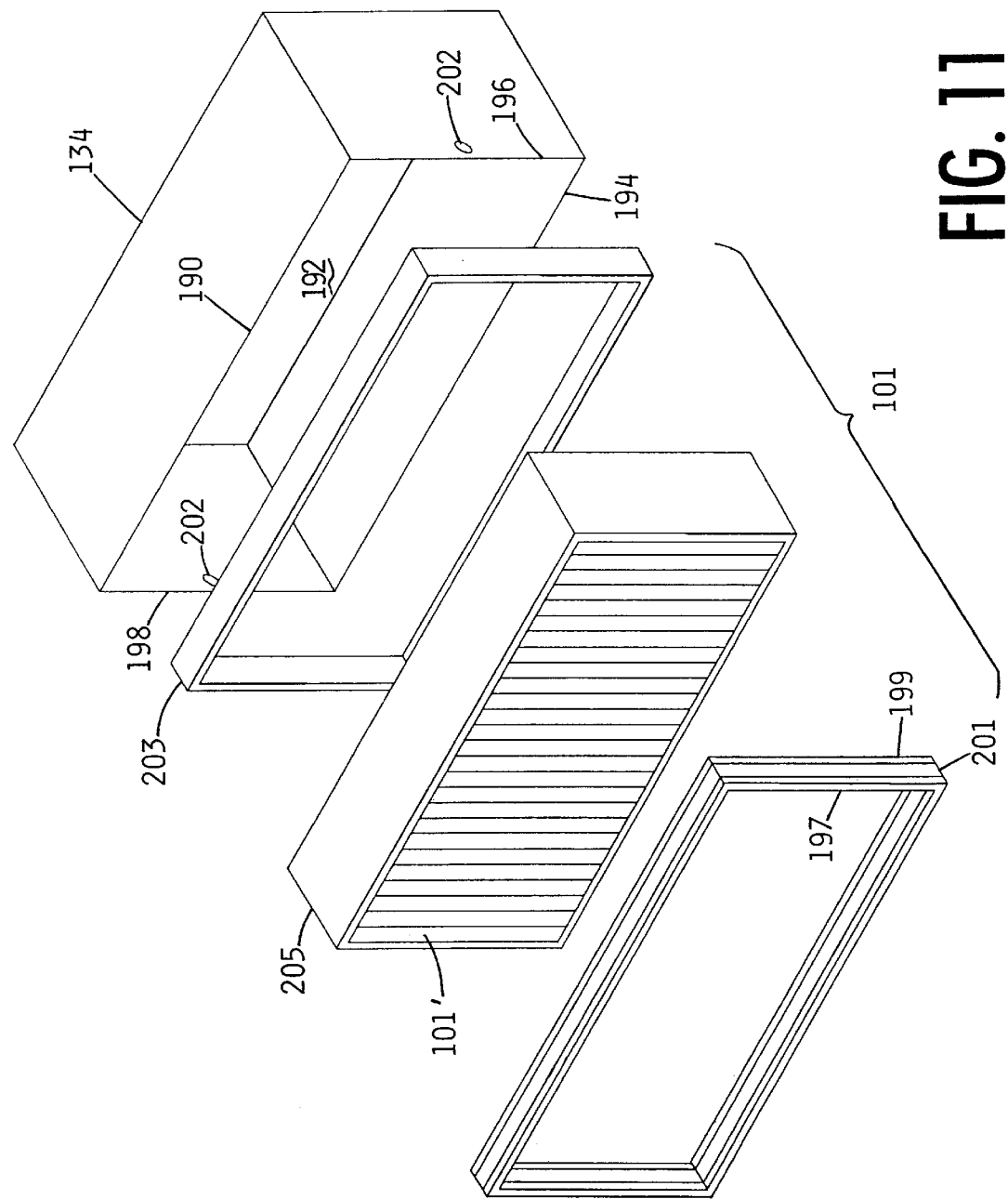
FIG. 11 is an exploded view of the HEPA filter assembly and the interior cover of the device of FIG. 1.

The placement of the HEPA filter assembly 101 in the in the interior cover 134 is shown in the exploded view of the assembly 101 in FIG. 11. The assembly 101 includes a pleated HEPA filter 101' disposed in a cardboard frame 205, a frame stand off 203 and a frame 201. Assembly 101 is arranged as follows. The frame standoff 203 is first placed in the interior cover 134. This maintains a space or plenum for the final filtered air to flow to the openings 200 shown in FIG. 1. Frame standoff 203 may be replaced by standoffs that are permanently affixed to the interior cover 134. After frame standoff 203 is inserted into the interior cover 134, the HEPA filter 101' in its cardboard frame 205 is inserted. Finally, frame 201 is inserted. Frame 201 has two closed cell foam pads 197 and 199 on either side. The interior cover 134 is dimensioned to fit over the upper casing 130 and the lower casing 132 when the casings 130, 132 are attached to each other. The interior cover 134 and the upper casing 130 each have openings 202 which are aligned when cover 134 and casing 130 are attached.

The interior cover 134 is placed over the attached upper casing 130 and lower casing 132, as shown in FIG. 1, and secured with a suitable fastener 204 such as screw hardware. The frames 203 and 201 are properly sized so that the foam pads 197 and 199 are in compression. This provides seals so that fresh air coming out of the fresh air blower 114 through openings 175 is forced to flow through the HEPA filter 101' and not around it.

A lower performance filter can be used in place of the HEPA filter 101'. Since lower performance filters have less depth than the HEPA filter 101', frame 203 must be replaced with one with greater depth. The ease with which filters of differing performance can be used is an advantage of the filter placement scheme shown in FIG. 11.

The final part of the housing 122 in each of the embodiments HRV 100, 100' is the exterior cover 136. The exterior cover 136 has a generally rectangular surface 206 having a plurality of openings 208 for air flow therein. Preferably openings 208 are louvered having a downwardly directed louver 208' to prevent rain and snow from entering the exterior cover 136. The exterior cover surface 206 has four edges 210, 212, 214, 216. Generally rectangular sides 218, 220, 222, 224 extend from the edges. The exterior cover 136 is suitably dimensioned to fit over the adjoined upper casing 130 and lower casing 132. The sides 220 and 224 of the exterior cover and the side walls 140 and 142 of the upper casing 130 each have suitable openings 226 to permit openings 226 to align when the HRV 100, 100' is assembled. Suitable fasteners 228 may be threaded through the openings 226 to fasten the exterior cover 136 to the joined upper casing 130 and lower casing 132. These fasteners 228, include but are not limited to, hardware screws.

As best shown in FIGS. 1–3 and 7, when the four portions of the housing 122 for first embodiment HRV 100 are fully assembled, the housing forms five compartments. A first compartment 230 is formed by upper casing top wall 138, upper casing side wall 140, upper casing side wall 141, lower casing bottom wall 160, lower casing upwardly side walls 162, 164, motor bulkhead 176, and blower bulkhead 180. The first compartment 230 contains the stale air blower 112. The openings 150, 152, and 174 provide for stale air to flow into this compartment.

A second compartment 232 is formed by the upper casing top wall 138, upper casing side walls 141 and 142, blower bulkhead 180, motor bulkhead 176, lower casing side walls 166, 164, and lower casing bottom wall 160. This second compartment 232 contains the fresh air blower 114, motor 120, and means for driving the air switch 116 with the gear motor 117. The openings 175 inside wall 164 provide fresh air flow out of this compartment. Covered windows 154 and 177 are located in this compartment.

A third compartment 234 is formed by the upper casing top wall 138, upper casing side walls 140, 142, lower casing bottom wall 160, lower casing side walls 162, 166, motor bulkhead 176, and regenerator bulkhead 178. This third compartment 234 contains the rotating air switch 116 and the gear motor 117.

A fourth compartment 236 is formed by regenerator bulkhead 178, upper casing top wall 138, upper casing side walls 140, 142, lower casing bottom wall 160, lower casing side walls 162, 166, and exterior cover 136. The forth compartment contains the regenerator manifolds 182A–182D and the regenerative heat exchangers 102A–102D. The openings 208 in exterior cover 138 permits fresh air flow into the regenerative heat exchangers 102A–102D and stale air to flow out of the regenerative heat exchangers 102A–102D.

A fifth compartment 240 is formed by the interior cover 134 and the upper casing side wall 141 and the lower casing side wall 164. This compartment preferably contains the HEPA filter assembly 101. The openings 175 on the lower casing side wall 164 permit fresh air to enter this compartment to travel through the HEPA filter 101' and then to exit through openings 200 into the structure 126 providing fresh filtered air. The air flow is generally balanced without the HEPA filter 101' in place. With the HEPA filter 101' is in place, the air flow is balanced by sealing off a portion of the stale air openings 150, 152, 174. This is easily done by placing tape over a portion of the openings 150, 152, 174 or by covering a part of the openings 150, 152, 174 with a material which blocks air flow, such as but not limited to, cardboard, plastic sheeting, or metal sheeting, or by using moveable louvers on the openings 150, 152, 174.

The use of interior cover 134 and the HEPA filter assembly 101 is optional as is illustrated in second embodiment HRV 100' shown in FIGS. 12 and 13. HRV 100' is identical in every element to the first embodiment HRV 100, except that the interior cover 134 and the HEPA filter assembly 101 are not present, that is, the fifth compartment 240 is absent. Thus, HRV 100 has a rectangular housing 122 with three housing portions, upper casing 130, lower casing 132 and exterior cover 136, each as previously described, herein. As such, HRV 101' has only four compartments, 230, 232, 234, 236, respectively, as previously described for the first embodiment 100.

As is known in the art, conventional electrical switches and wiring (not shown) are used in the HRV 100, 100'. The HRV 100, 100' has a continuously variable blower (high speed/low speed) switch 242 which also serves as an on-off switch for both the blower motor 120 and the gear motor 117, which drives the rotating air switch 116. Hereinafter the switch 242 is also referred to as the on-off switch 242. Another switch, a gear motor switch 244 is used to just turn off and on the gear motor 117. A conventional electrical cord 246 with a plug 248 provides electricity to operate the motors 117, 120 in the HRV 100, 100' when the HRV 100, 100' is energized with electricity. Automatic defrost can be added to the HRV 100, 100' by placing a thermometer (not shown) to sense outside temperature. When the outside temperature gets low enough, appropriate conventional electronics can be used to turn the gear motor 117 on and off continuously, such that the rotating air switch 116 rotates half a turn (e.g., 180°); stops for a period of time; rotates half a turn in the same direction, (e.g., 180°); stops; etc. This reduces the effectiveness of the heat exchange which, in turn, reduces the temperature at which frost sets in. As outside temperature decreases, the period of time, during which the gear motor 117 stops, can be increased.

The present invention is operated in the following way. The electrical cord is plugged into a conventional electrical outlet. The on-off switch 242 is activated. This activates the motor 120. Gear motor 117 is also activated at this time. Stale air enters the HRV 100, 100' through the side openings 152, 174 and top openings 150 of the housing 122 and is drawn into the first compartment 230 by the stale air blower 112. Thus, the stale air from the indoor climate of the structure 126 is forced into the housing 122 and forms a stale airstream.

In both embodiments, the fresh air blower 114 and the stale air blower 112 are driven by the single motor 120. The stale air blower 112 blows the stale air through the opening 186 in the motor bulkhead 176 into the third compartment 234, e.g., the space between the motor bulkhead 176 and the regenerator bulkhead 178. The stale airstream flows into the rotating air switch 116. The rotating air switch 116 transports the stale airstream from the third compartment 234 into the stationary regenerative heat exchangers 102A–102D in the fourth compartment 236.

The rotating air switch 116, as best shown in FIGS. 5, 6, 15A and 15B is comprised of two circular side plates and a manifold extending therebetween. The two circular side plates are a motor side plate 260 and a regenerator side plate 262. Preferably, the motor side plate 260 and the regenerator side plate 262 are identical in circular dimension and spaced parallel to each other. In the preferred embodiment, the motor side plate 260 is dimensioned to be larger than the circular opening 184 in the motor bulkhead 176. Likewise, the regenerator side plate 262 is dimensioned to be larger than the circular opening 188 in the regenerator bulkhead 178. The motor side plate 260 and the regenerator side plate 262 are approximately 8% larger in diameter than the corresponding circular opening 184, 188 in the respective bulkheads 176, 178. (In the preferred embodiment, the motor side plate 260 and the regenerator side plate 262 each have outer diameters of about 7 inches; where as, the circular openings 184, 188 in the respective bulkheads, each have diameters of about 6.5 inches.) The bulkhead circular openings 184, 188 are preferably concentric. The side plates 260, 262 are preferably concentric with each other and with the bulkhead circular openings 184, 188. The clearance seals 118, 119 are preferably "noncontacting" clearance seals, e.g., air gaps. The clearance seal 118 is a small air gap between the motor side plate 260 and the opening 184 in the bulkhead 176. The clearance seal 119 is a small air gap between the regenerator side plate 262 and the opening 188 in the bulkhead 178. Thus, the bulkheads 176, 178 and respective side plates 260, 262 are not in contact. In the preferred embodiment, the clearance seals 118, 119 are face seals, not rim seals. By the term "face" seals it is meant that the air gaps are between the bulkheads and the respective side plates of the rotating air switch 116. In the preferred embodiment, the bulkheads 176, 178 are in place in the housing 122 and the rotating air switch 116 is slipped between the bulkheads 176, 178. Side plate 260 is adjacent to and in almost abutting relationship with bulkhead 176. The clearance seals 118, 119 are air gaps of approximately 0.015 inches and prevent full contact of the side plates 260, 262 with the respective bulkheads 176, 178. Side plate 262 is adjacent to and in almost abutting relationship with bulkhead 178.

The rotating air switch 116, may be mounted in the HRV 100, 100' in an alternate manner as may be appreciated by those skilled in the art. In this alternative mounting schema all other aspects of the HRV 100, 100' are identical, except as described subsequently. In this alternative mounting schema, the motor side plate 260 is dimensioned to fit within the circular opening 184 in the motor bulkhead 176 to allow rotation of the rotating air switch 116 within the opening 184. The regenerator side plate 262 is dimensioned to fit within the circular opening 188 in the regenerator bulkhead 178 to allow rotation of the rotating air switch 116 within the opening 188. The clearance seals, 118, 119 are preferably noncontacting clearance seals, e.g, air gaps. In this embodiment noncontacting clearance seals 118, 119 are rim seals, e.g. small gaps between the circumference of the circular openings, 188,184 and the respective side plate 262, 260. Thus clearance seal 118 between the opening 184 and the motor side plate 260 prevents scraping of the rotating air switch 116 against the circular opening 184 while sealing air flow. The clearance seal 119 between the opening 188 and the regenerator side plate 262 prevents scraping of the rotating air switch 116 against the circular opening 188 while sealing air flow. In this alternative mounting schema, a side plate 260, 262 of the rotating air switch 116 is placed into the corresponding openings 184, 188 of one bulkhead 176, 178, then the other bulkhead 178, 176 is positioned such that the other opening 188, 184 encompasses the other side plate 262, 260 of the rotating air switch 116. The clearance seals (rim seals) 118, 119 are air gaps of approximately 0.015 inches and prevent full contact of the side plates 260, 262 with the respective bulkheads 176, 178.

Figure 15A:
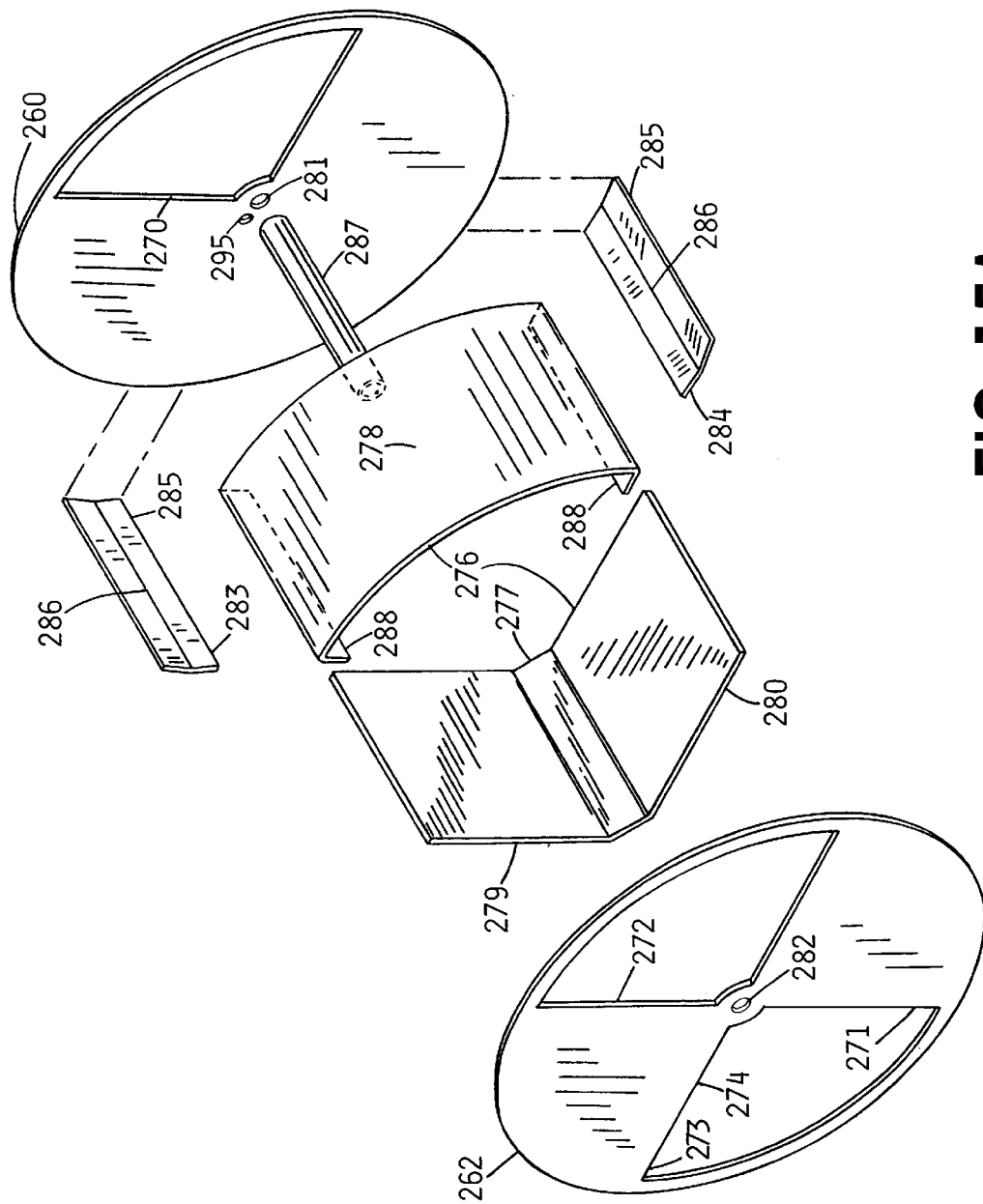
FIG. 15A is an exploded enlarged view of the rotating air switch of FIG. 5.

In either embodiment 100, 100' and in either way of mounting the rotating air switch 116, the motor side plate 260 has a single air switch motor side plate opening 270. Preferably motor side plate opening 270 is a quarter circle (e.g., subtends an angle of approximately 90°), pie shaped opening. As is used herein throughout, "pie shaped" refers to a shape bounded on two sides by concentric circular arcs of different radii and bounded on the other two sides by radial lines. The regenerator side plate 262 has two air switch regenerator side plate openings 272 and 274. Preferably, the regenerator side plate openings 272 and 274 are each quarter circle (e.g., subtend an angle of approximately 90°), pie shaped openings and are spaced approximately 90° apart. A manifold 276 rigidly extends between the two circular side plates 260, 262 maintaining them in a parallel spaced relationship. The manifold 276 connects the motor side plate opening 270 with one of the regenerator side plate openings 272. As best shown in FIGS. 5, 6, 15A and 15B, the manifold 276 has four major sides. These major sides are a shaft side portion 277, an opposite portion 278, a first side portion 279 and a second side portion 280. The first side portion 279 extends between the portion 277 and opposite portion 278. The second side portion 280 is disposed shaft side opposite portion 279 and connects portion 277 and portion 278. Preferably, as best shown in FIG. 15A, the shaft side portion 277 is a small planar portion extending between first side portion 279 and second side portion 280. Opposite portion 279 is a large circular arc portion smaller in outer radius than the side plates 260,262 but concentric therewith.

Figure 15B:
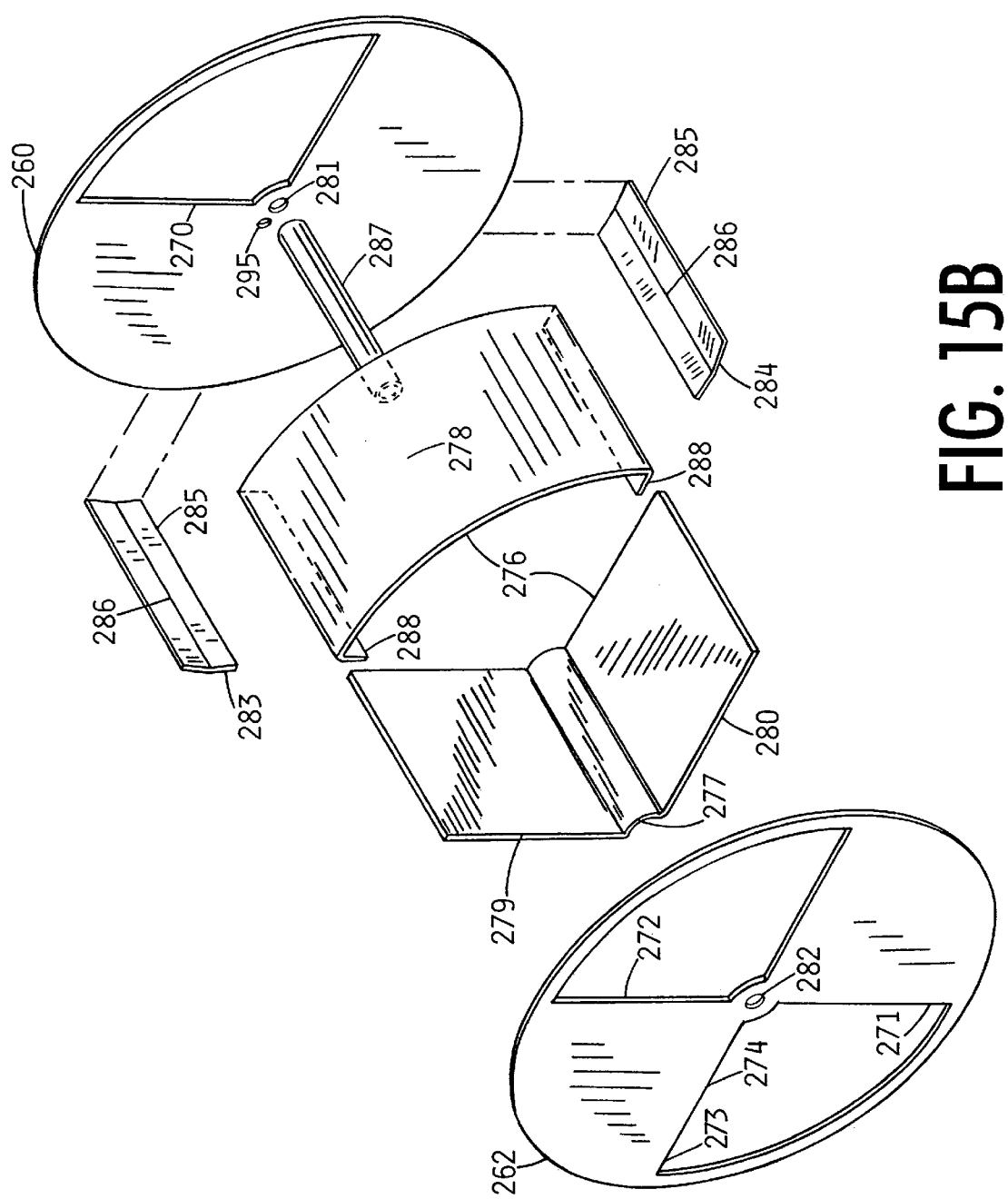
FIG. 15B is an exploded enlarged view of the rotating air switch of FIG. 5 illustrating an alternative pie shaped manifold.

Alternatively, as best shown in FIG. 15B, the manifold 276 is pie shaped. Thus the shaft side portion 277 is a small circular arc curved portion extending between first side portion 279 and second side portion 280, and the opposite portion 278 is a large circular arc portion concentric with the shaft side portion 277. Opposite portion 278 is smaller in outer radius than side plates 260, 262 but concentric therewith.

As shown in FIGS. 5, 6, 15A and 15B, the manifold portions 277, 278, 279, 280 of the rotating air switch 116, collectively form a fresh air passageway in the rotating air switch.

As best illustrated in FIGS. 15A and 15B, the three portions 279, 277 and 280 may be preferably bent of a single piece of sheet metal, or other suitable metal material. The large circular arc portion 278 is also made of sheet metal and has a pair of sides or tabs 288 (partially shown in phantom lines). The sides 288 are suitably bent and shaped so that they may be fastened to the first side portion 279 and to the second side portion 280. The bent sides 288 provide additional strength to the rotating air switch 116. The sides 288 are preferably welded to side portions 279, 280. (The weld material is not shown.) Alternatively the rotating air switch may be formed of an injection molded plastic material, such as, but not limited to polyvinyl chloride plastics (PVC), or fabricated of a cast metal. When the rotating air switch 116 is injection molded or cast, the tabs 288 are optional.

Each side plate 260, 262 has an aperture disposed in the center of the side plate. The motor side plate 260 has center aperture 281; the regenerator side plate 262 has center aperture 282. The rotating air switch further has two braces 283, 284 extending from the motor side plate 260 to the regenerator side plate 262. The braces 283, 284 serve to maintain the side plates 260, 262 in a fixed generally parallel geometry. The braces 283, 284 are preferably identically constructed elongated rectangles 285 with an angled bend 286 running the length of the rectangle 285. The bend 286 preferably adds additional strength to each of the braces 283, 284. Regenerator side plate opening 274 has two sides 271, 273. The braces 283, 284 are preferably disposed near sides 271, 273 of the opening 274.

The rotating air switch further has a shaft receiving portion 287 extending from the motor side plate 260 to the regenerator side plate 262 and centered on the center apertures 281, 282. Center aperture 281 and center aperture 282 are centered with respect to each other and spaced in a generally parallel spaced relationship to each other. The shaft side portion 277 of manifold 276 is adjacent to and preferably in contacting, e.g., abutting, relationship with shaft receiving portion 287. Ends of shaft receiving portion 287 are preferably spot welded to side plates 260, 262. (The weld material is not shown).

Figure 7:
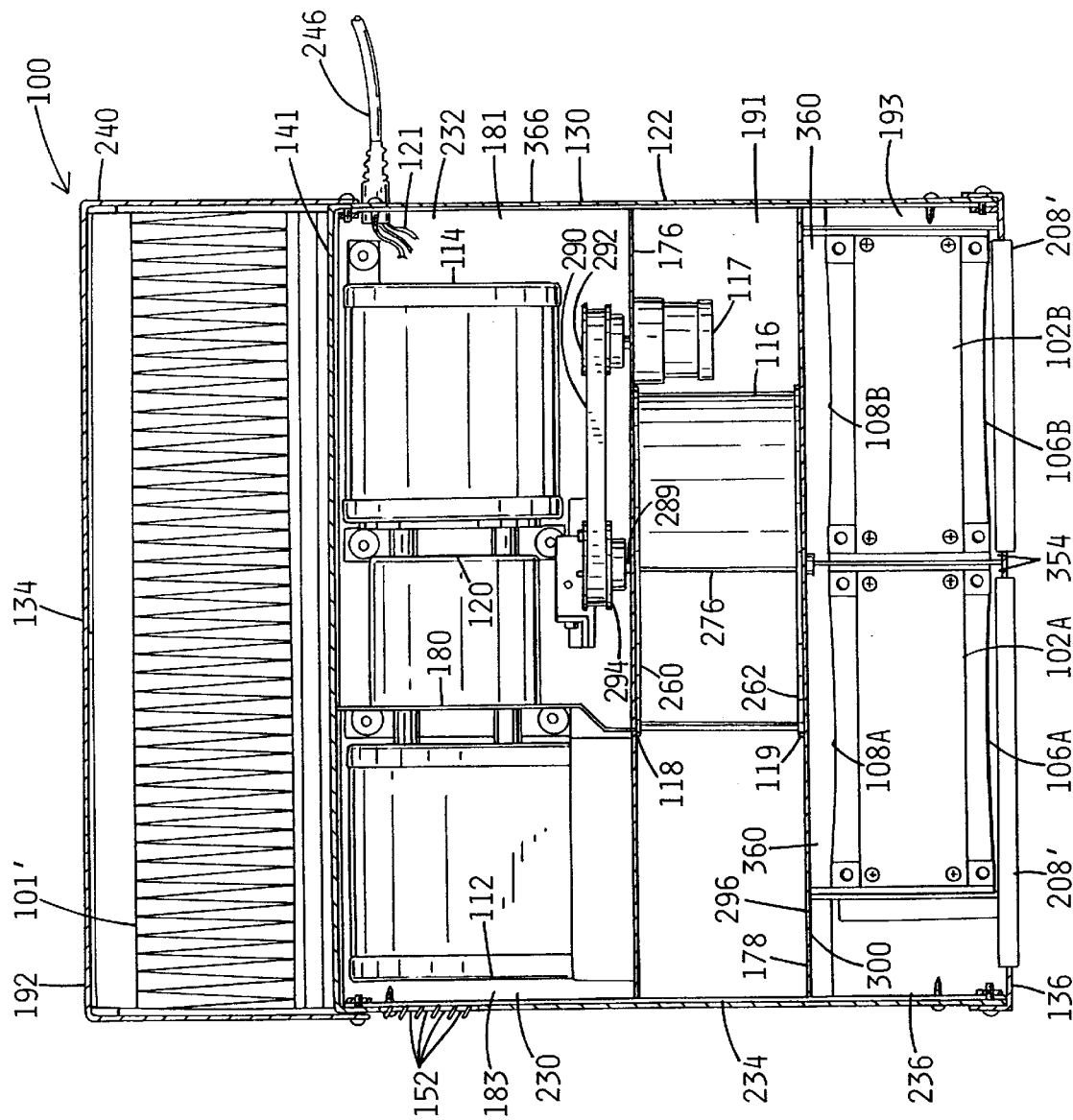
FIG. 7 is a top schematic view of the device of FIG. 1 illustrating the interior of the five compartments comprising the present invention, with upper casing top wall, interior cover top wall, a portion of the exterior cover, and portions of the sealing materials removed.

The rotating air switch 116 is mounted on a shaft 289, as is best shown in FIG. 7. Shaft 289 passes through the center apertures 281, 282 of each respective side plate 260, 262 and through the shaft receiving portion 287. The rotating air switch 116 is driven in a conventional manner by the small gear motor 117 using convention means, e.g., through a timing belt 290 and two pulleys 292 and 294. The motor side plate 262 has a second aperture 295 therein. The second aperture 295 is suitably dimensioned for accepting a set screw (not shown) which is attached to pulley 294. A hole (not shown) is drilled or tapped into the pulley 294 to accept the set screw. In this manner the pulley 294 is locked with the rotating air switch 116.

The gear motor 117 turns pulley 292 which drives timing belt 290 which, in turn, drives pulley 294, forcing it to turn. Since pulley 294 and the rotating air switch 116 are locked and centered about the common shaft 289, the rotating air switch 116 is forced to rotate. In operation the shaft 289 permits the rotating air switch 116 full 360° continuous rotation. This arrangement advantageously simplifies the operation of the HRV as compared to the prior art devices utilizing periodic acute angled back/forth rotation.

The stale airstream, which is forced into the third compartment 234 between the two bulkheads 176, 178 by the stale air blower 112, can only exit that region through the rotating air switch side plate opening 274, e.g., the opening not covered by the manifold 276. Effectively, a stale air passageway is created by the first and second side portions 279, 280, the shaft receiving portion 287, and the motor side plate 260 and regenerative side plate 262. The stale airstream then flows through a portion of the opening 188 in the regenerator bulkhead 178 and into the fourth compartment 236, containing the regenerative heat exchangers 102A–102D.

The regenerator bulkhead 178 has an interior side 296 facing the motor bulkhead 176 and an opposite exterior side 300 facing the regenerative heat exchangers 102A–102D. On the exterior side 300 of the regenerator bulkhead 178, there are four bulkheads which together with the casing and regenerator bulkhead 178 form the four regenerator manifolds 182A–182D for holding the regenerative heat exchangers 102A–102D. There is preferably a horizontal regenerator bulkhead 302; a center vertical bulkhead 304; a left vertical bulkhead 306 and a right vertical bulkhead 308. Four rectangular manifolds 182A–182D with the same dimensions are thus formed, with the top wall 138 of the upper casing 130 forming top walls of two of the regenerator manifolds (182A–182B) and the bottom wall 160 of the lower casing 132 forming bottom walls of the remaining two regenerator manifolds (182C–182D). Each of the regenerator manifold 182A–182D has an identical manifold width 312, an identical manifold height 314 and an identical manifold depth 316.

Figure 9:
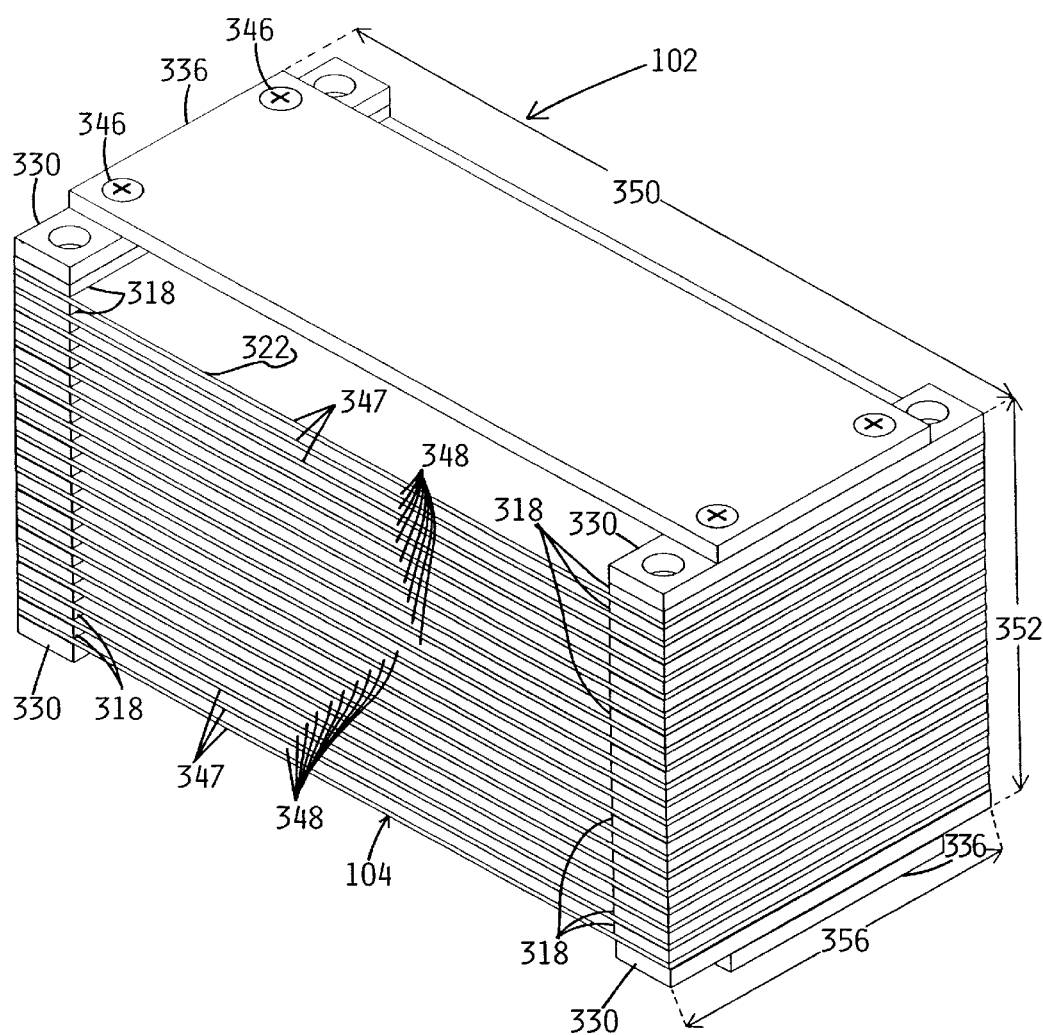
FIG. 9 shows the most preferred elastomer bed regenerative heat exchanger of the device of FIG. 1.
Figure 10:
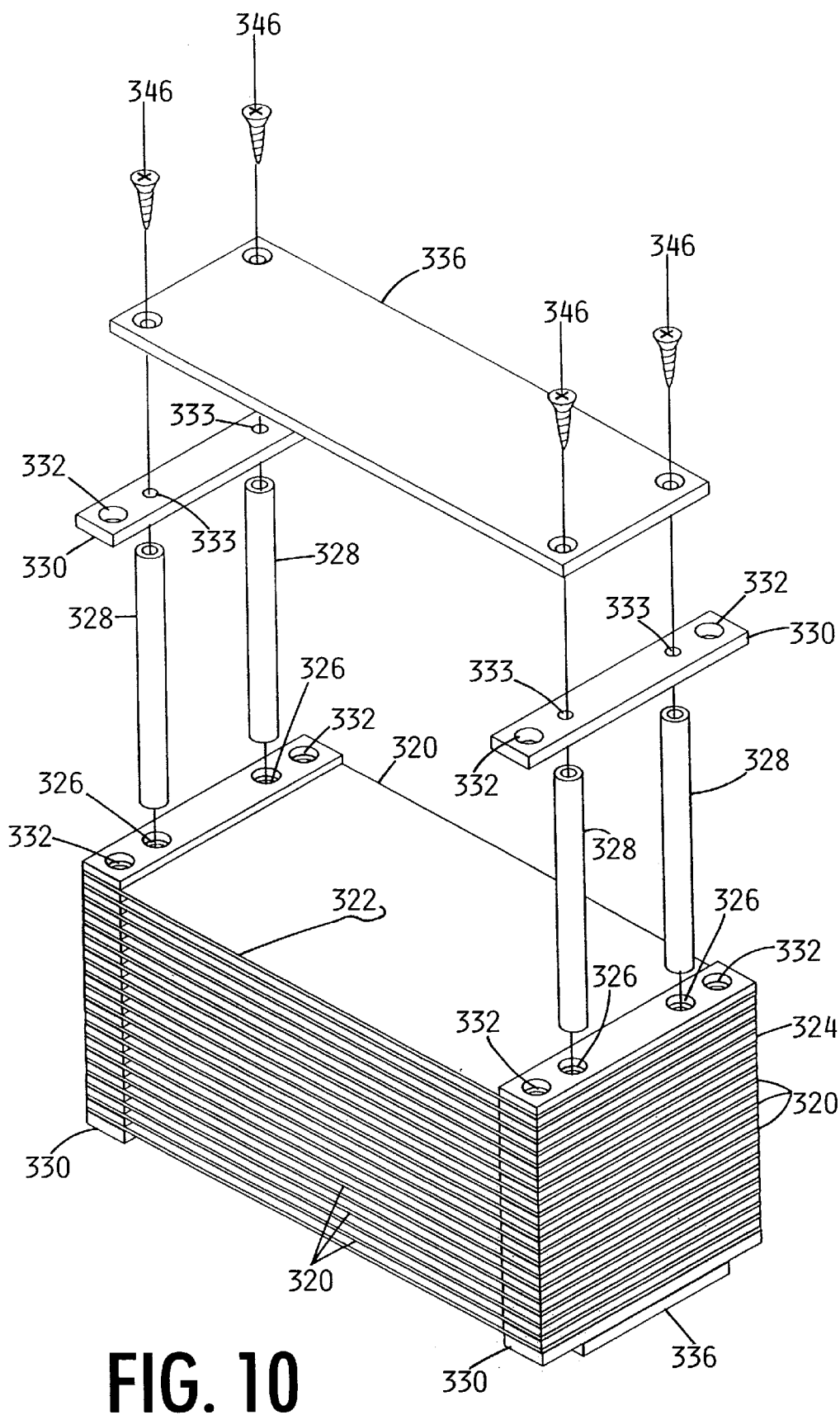
FIG. 10 is a partially exploded view of the elastomer bed regenerative heat exchanger of FIG. 9.

The four rectangular regenerative heat exchangers 102A–102D are placed in the respective rectangular regenerator manifolds 182A–182D. The regenerative heat exchangers 102A–102D are identically dimensioned and constructed. FIGS. 9 and 10 show the detailed structure of a most preferred elastomer bed regenerative heat exchanger labeled as 102, which may be anyone of regenerative heat exchangers 102A–102D. The materials and method of construction of the rectangular regenerative heat exchanger 102 is shown in U.S. Pat. No. 5,339,653, the disclosure of which, is hereby incorporated by reference. Briefly, the most preferred regenerative heat exchangers 102A–102D are elastomer beds, which are each constructed as follows: two plastic spacers 318 (having prepunched holes 332) are bonded to each unstretched sheet 320 (having prepunched holes 326) of elastomer 322. The plastic spacers are preferably PVC plastic. A stack 324 is made with the holes 332, 326 in alignment.

Four steel tubes 328 are inserted through holes 326 in the stack 324. Four rectangular metal blocks 330 are placed in alignment with the spacers 318. The rectangular metal blocks 330 each have two outermost holes 332 used for stretching and two innermost holes 333 which are in alignment with the holes 326 in the stack 324. Temporary stretching rods (not shown) are inserted through holes 332. The stretching rods (not shown) stretch the elastomer sheets 322 an amount to allow two steel side plates 336 to be fastened with eight sheet metal screws 346 to the steel tubes 328. The stretched elastomer sheets 347 are shown in FIG. 9. The stretching rods are then removed. An air channel 348 is formed between pairs of stretched elastomer sheets 347. Silicone rubber sheeting, as well as, blown polyurethane film is used for the elastomer 322.

In place of the preferred elastomer bed regenerative heat exchanger with parallel air channels, other known heat exchangers can be used having different geometric configurations of the heat exchanger matrix and/or using different heat exchanger materials. For example, see channel geometries which have a hexagonal cross section or a circular cross section (U.S. Pat. Nos. 4,411,310, 4,577,678); rectangular cross section (U.S. Pat. No. 4,733,718); triangular cross section or curvilinear cross section (U.S. Pat. No. 3,326,214); or other geometric cross sections (U.S. Pat. No. 5,010,594). Such alternate regenerative heat exchangers are suitably dimensioned to fit within the manifolds 182A–182D.

Exemplary of an alternate regenerative heat exchanger is heat exchanger 102' to be used in the HRV 100, 100' of the present invention which is best shown in FIGS. 17A–17D where a triangular cross sectional geometry is used for the air flow channels. Alternative regenerative heat exchanger 102' uses alternating layers of a corrugated sheeting material 422 and a flat sheeting material 423 to make a heat exchange matrix 104'. The corrugated sheeting material 422 and the flat sheeting material 423 suitably include, but are not limited to, plastics and metal or treated paper materials having heat exchange or heat and moisture exchange properties and having sufficient rigidity to maintain the geometric structure. For example, plastics such as polystyrene, vinyl, polyester, metals such as, stainless steel, aluminum, and paper such as cardboard or fibrous paper treated with resin, may be used.

Specifically, alternative regenerative heat exchanger 102' is suitably made of alternating rectangular flat sheets 423 of aluminum and corrugated sheets 422 of aluminum. Sheets 422, 423 are stacked into a layered stack 424 forming matrix 104'. Sheets 422, 423 are oriented such that triangular cross sectional air channels 448 are formed. A four sided frame 470 is affixed around matrix 104'. Four sided frame 470 has a top member 472, an opposite parallel bottom member 474, a left side member 476 and a right side member 478, both of which are positioned between top member 422 and bottom member 474. Retainer strips 480 connect top member 472 and bottom member 474 to each other on unframed sides 482, 484 of matrix 104'. Regenerative heat exchanger 102' has an outside climate side 106 and an inside climate side 108 when regenerative heat exchanger 102' is placed in manifold bulkhead 182A–182D of HRV 100, 100'. The unframed sides 482, 484 may be oriented to form the outside and inside climate sides 106, 108 respectively.

It is also understood that a filter material (not shown), such as, but not limited to open cell rubber foam, fiber, paper, or spun glass, as is known in the art may also be used. This filter materials may be used as the heat exchanger matrix 104' and placed in the rectangular four sided frame 470, instead of materials 422, 423, to make a regenerative heat exchanger to be used in HRV 100, 100'. When such filter materials are used to make the regenerative heat exchanger for use in HRV 100, 100', filtering of the air, as well as heat exchange is performed.

In any of the different geometric configurations of the heat exchanger matrix 104, 104', or materials used for layers, each of the regenerative heat exchangers 102A–102D or 102' has a heat exchanger width 350 and heat exchanger height 352 which is somewhat less than corresponding dimensions for the manifold width 312 and manifold height 314. Sealing material 354 is used around the regenerative heat exchanger 102, 102' to force air flow to go through the regenerative heat exchanger 102, 102' and not around. An example of preferred sealing material 354 is woolen felt pads. The regenerative heat exchanger 102, 102' has a heat exchanger depth 356 which is sufficiently less than the depth 316 of the rectangular manifold 182. This difference in depth dimensions provides that a sufficient air distribution plenum 360 is formed between the inside climate side 108 of the regenerative heat exchanger 102, 102' and the regenerator bulkhead 178. The volume of the plenum 360 is significantly less than a volume of air contained in the regenerative heat exchanger 102, 102'.

Preferably, the plenum volume 360 is 10% to 20% of the volume of the air contained in the preferred regenerative heat exchanger 102. The volume of air contained in the regenerative heat exchanger 102 of the most preferred embodiment is easily calculated by summing the volume of each of the rectangular air channels 348 between pairs of the stretched elastomer sheets 347 in the matrix 104 of the regenerative heat exchanger 102. If the air plenum volume 360 is too large, then there is a dead volume generated, reducing the flow through the regenerative heat exchangers 102A–102D.

Where the alternative regenerative heat exchanger 102' has a nonparallel sheet heat exchanger matrix geometry, the cross section area of each channel can be geometrically approximated and multiplied by the length of the channel to compute the air volume of the channel. Then all channel volumes are summed to approximate the volume of air in the regenerative heat exchanger 120'. For example in the configuration used in FIGS. 17A–17D which a triangular cross section area 450 is used for the air channel 448. The volume of an individual triangular channel 448 is calculated by computing the cross sectional area 450 of the triangle times the length of the channel. The length of the channel 448 extends from unframed side 482 to unframed side 484. As is commonly known, area of a triangle as is ½ base of the triangle times the height of the triangle.

To continue explaining the workings of the HRV 100, 100', the fresh air blower 114 draws air from a plenum 366 formed by the second compartment 232 and the motor side plate 260 of the rotating air switch 116. The only opening is the opening 270 in the motor side plate 260. Hence, fresh air is drawn through opening 270. This opening is connected to the opening 272 of the regenerator side plate 262 by the manifold 276 of the rotating air switch 116. Thus, simultaneously a fresh airstream is drawn (forced) in through opening 272 of the regenerator side plate 262 while the stale airstream is blown out through opening 274.

As best shown in FIG. 8, the horizontal regenerator bulkhead 302 and the center vertical bulkhead 304 divide the circular opening 188 in the regenerator bulkhead 178 into four 90° quadrants (368, 370, 372, 374). Each quadrant is an opening into one of the four regenerator manifolds 182A–182D. Thus quadrant 368 opens into regenerator manifold 182A. Quadrant 370 opens into regenerator manifold 182B. Quadrant 372 opens into regenerator manifold 182D. Quadrant 374 opens into regenerator manifold 182C. As the rotating air switch 116 turns, each quadrant is exposed to the fresh air opening 272 of the regenerator side plate 262, then to the stale air opening 274, then to the fresh air opening 272, and so on.

Figure 14:
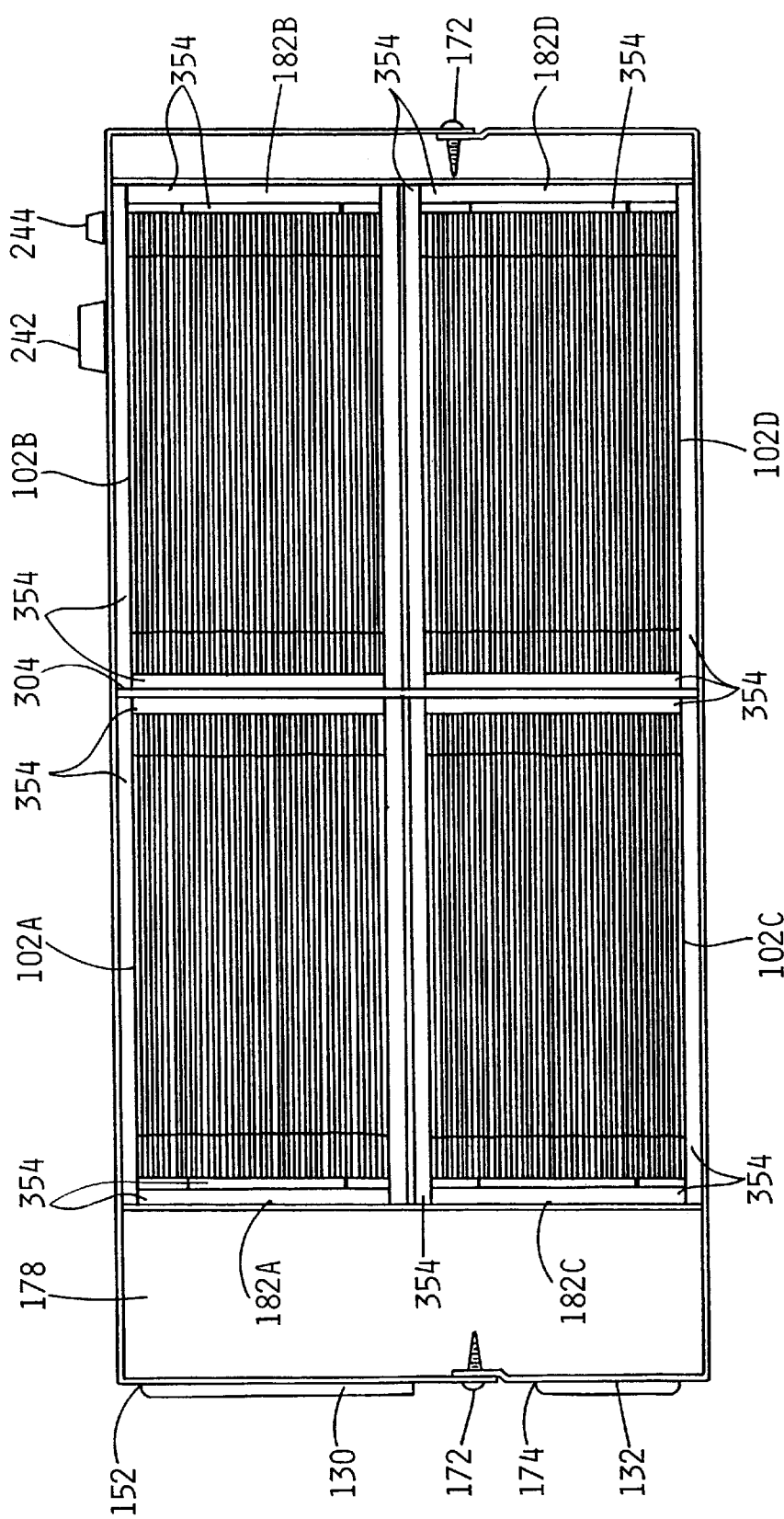
FIG. 14 is a view of the exterior side, oriented as in FIG. 8, for either embodiment of FIG. 1 or FIG. 12 showing the arrangement of the stationary regenerative heat exchangers and the sealing materials, when the exterior cover is removed.
Figure 16A:
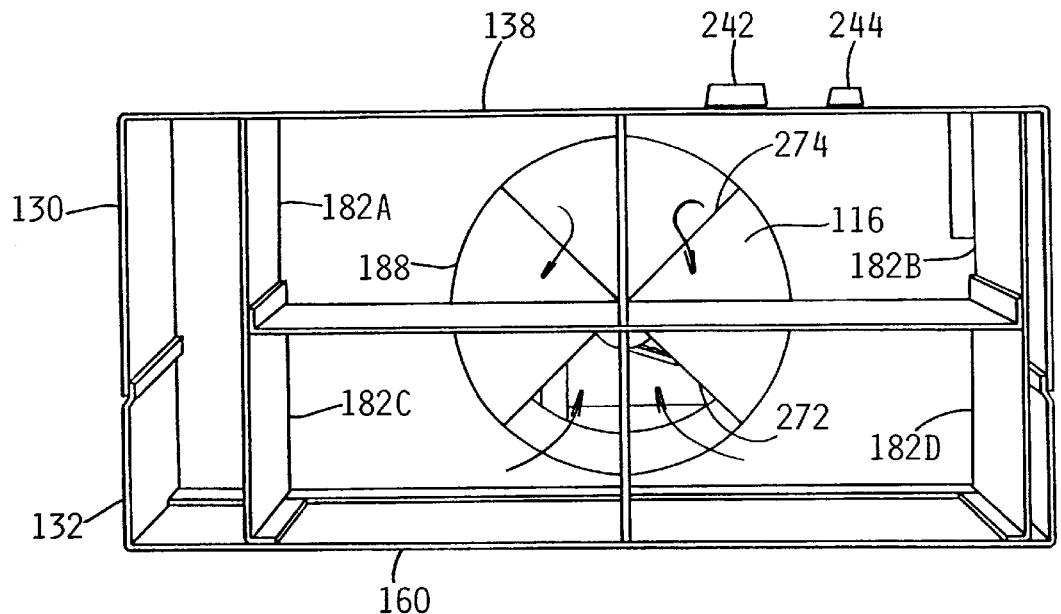

The flow of the stale air out of the regenerative heat exchangers 102A–102D and the flow of the fresh air into the regenerative heat exchangers 102A–102D is illustrated schematically in FIGS. 16A–16D. The regenerative heat exchangers 102A–102D, stationary seals 354 and exterior cover 136 have been removed to best illustrate the travel of the rotating air switch 116 with respect to the regenerator manifolds 182A–182D. The arrows illustrate the air flow as will be discussed subsequently. FIG. 16A shows the rotating air switch in the position shown in FIG. 8. In actual operation, the regenerative heat exchangers 102A–102D, the stationary seal 354 (which are sealing materials which are placed in regenerator manifolds 182A–182D as shown in FIG. 14) are in place in the regenerator manifolds 182A–182D and the exterior cover 136 is attached as is shown in FIG. 1.

As best shown in FIG. 16A, for the rotating air switch 116 in the position shown with the bulkhead 304 bisecting the opening 274 and also bisecting the opening 272, (e.g., the position shown in FIG. 8) fresh air is drawn in through the lower two regenerator manifolds 182C–182D while stale air is blown out through the upper two regenerator manifolds 182A and 182B.

Figure 16B:
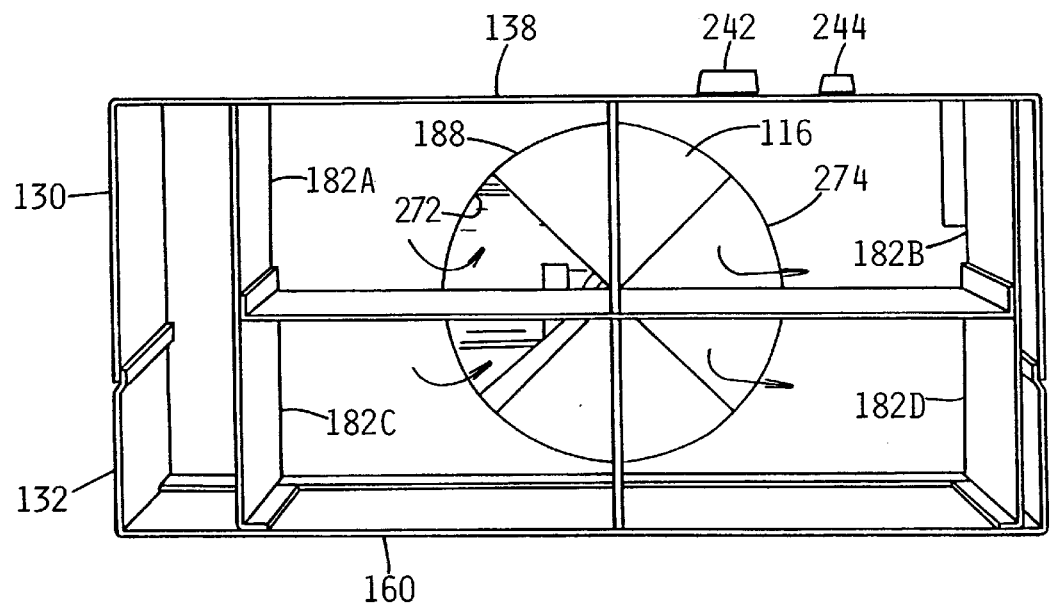

Referring now to FIG. 16B, assuming a clockwise rotation, a quarter turn (i.e., 90°) of the rotating air switch 116 from the one shown in FIG. 16A, the right two regenerator manifolds (182B, 182D) receive an outward flow of stale air while the two leftmost regenerator manifolds (182A, 182C) receive an inward flow of fresh air.

Figure 16C:
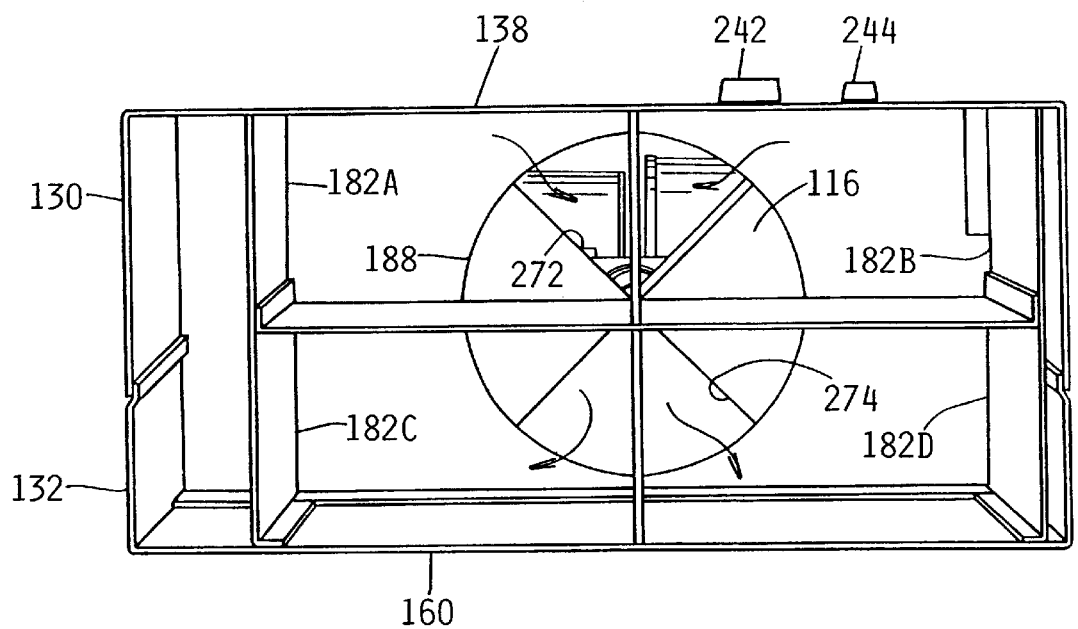

Referring now to FIG. 16C, a half turn (i.e., 180°) of the rotating air switch 116 position as from the one shown in FIG. 16A, the lower two regenerator manifolds (182C, 182D) receive an outward flow of stale air while the upper two regenerator manifolds (182A, 182B) receive an inward flow of fresh air. Thus in a 180 degree turn there is a reciprocating air flow in a regenerator bed.

Figure 16D:
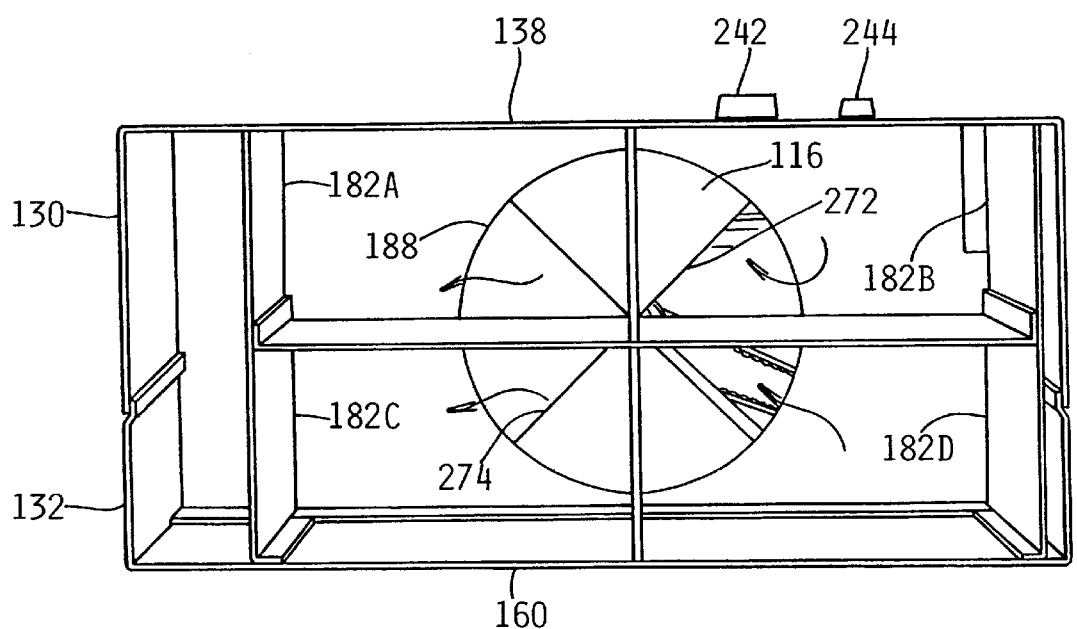

Referring now to FIG. 16D, for a three quarters (i.e., 270°) of a turn of the rotating air switch position from the one shown in FIG. 16A, the left two regenerator manifolds (182A, 182C) receive an outward flow of stale air while the right two regenerator manifolds (182B, 182D) receive an inward flow of fresh air.

In this way, each regenerator manifold 182A–182D, and each regenerator heat exchanger 102A–102D, respectively, contained therein, receives a reciprocating flow of stale air flowing outward to the outside climate, followed by fresh air flowing inward to the inside climate. Heat and moisture (if any) are thus transferred from the outwardly flowing stale air to the inwardly flowing fresh air by the regenerator matrix 104.

The HRV 100, 100' uses a number of clearance seals which are noncontacting, e.g., they are air gaps. As previously described, there is a clearance seal 118 between the motor side plate 260 of the rotating air switch 116 and the motor bulkhead 176. There is a clearance seal 119 between the regenerator side plate 262 of the rotating air switch and the regenerator bulkhead 178.

Furthermore, there are two face clearance seals between the horizontal regenerator bulkhead 302, and the regenerator side plate 262 and also two face clearance seals between the center vertical regenerator bulkhead 304 and the regenerator side plate 262. These four noncontacting clearance seals 380, 382, 384 and 386 are best shown on FIG. 8 and are preferably air gaps of approximately 0.015 inches, but may suitably range from 0.005 inches to 0.035 inches. Clearance seal 380 is between the top portion of vertical bulkhead 304 and side plate 262 forming an air leakage path between regenerator manifold 182A and 182B. Clearance seal 384 is between the bottom portion of vertical bulkhead 304 and side plate 262 forming an air leakage path between regenerator manifold 182C and 182D. Clearance seal 382 is between the right portion of horizontal bulkhead 302 and side plate 262 forming an air leakage path between regenerator manifold 182B and 182D. Clearance seal 386 is between the left portion of horizontal bulkhead 302 and side plate 262 forming an air leakage path between regenerator manifold 182A and 182C. Each of these noncontacting clearance seals 118, 119, 380, 382, 384, 386 is between positively pressurized stale air emerging from the stale air blower 112 and negatively pressurized air entering the fresh air blower 114. Hence, all clearance seal leakage causes stale air to enter the fresh airstream entering the fresh air blower 114 without entering the regenerative heat exchangers 102A–102D. This has the effect of reducing the ventilation rate. Advantageously, the clearance seal leakage of clearance seals 118, 119, 380, 382, 384, and 386 does not reduce heat recovery. In contrast, much of the seal leakage in the prior art rotating wheel regenerator has the effect of reducing heat recovery.

As best shown in FIGS. 1–11, for the first embodiment HRV 100, the fresh airstream is driven by the fresh air blower 114 out through louvers 175 into the interior cover 134. The interior cover 134 preferably houses the rectangular HEPA filter 101'. The fresh airstream must pass through the HEPA filter 101' before leaving the housing 122 through openings 200 and entering the building. When the HRV is operated without the HEPA filter assembly 101 and the interior cover 134, as is best shown in FIG. 12, for the second embodiment HRV 100', the fresh airstream enters the room directly through louvers 175, unfiltered. The first embodiment HRV 100 and the second embodiment HRV 100' are alike in all other aspects of the invention.

The present invention is further explained by the following example which should not be construed by way of limiting the scope of the present invention.

EXAMPLE 1

An HRV was constructed according to the disclosure above using sheet metal for the housing, all bulkheads, baffle and rotating air switch, using commercially available components for the HEPA filter, blowers, blower motor, switches, electrical cord, plug, wiring, gear motor, pulleys and timing belt. The blower used was a DAYTON™ low profile blower, stock number 4C826 commercially available in the GRAINGER 1997 CATALOG(NO. 388), of W. W. Grainger, Inc., Palatine Ill. The gear motor used was a HURST™ instrument motors unit, commercially available from the aforementioned GRAINGER 1997 CATALOG, stock number 6Z540.

The rectangular regenerative heat exchangers/elastomer beds/regenerator beds were made according to the disclosure in U.S. Pat. No. 5,339,653 using 0.010 inch thick silicone rubber sheeting for the elastomer material with 0.034 inch spacing between sheets of elastomer. The spacers were made of PVC plastic. The total cross section of each rectangular regenerative heat exchangers was 15 square inches (3 inches height×5 inches width). The unstretched elastomer sheet size was 3 inches by 3⅝ inches. Seventy elastomer sheets were used. The depth of the regenerative heat exchanger in the flow direction was 3 inches. The period of time of rotation of the rotating air switch was 6 seconds for a 360° turn.

The HRV had the following performance characteristics:

Maximum power requirement: 85 W

Maximum ventilation rate: 70 CFM

Effectiveness (sensible): 85%

The housing dimensions of the HRV were (depth×width× height): 13"×16"×7½" (without HEPA filter) 18"×16"× 7½" (with HEPA filter)

The HRV had a continuously variable blower switch which also served as the on-off switch for both the blower and the gear motor which drove the rotating air switch. There was an additional on-off switch for the gear motor which allowed the gear motor to be turned off while the blower remained on. When this occurred, there was balanced flow filtered ventilation without heat recovery. There are times when this is desirable, for example, on a cool summer night with a hot building.

The HRV was constructed without an automatic frost protection or defrost cycle. When outside temperature was sufficiently below freezing and indoor humidity was sufficiently high, frost buildup on the exterior of the regenerator beds was observed. The interior cover and HEPA filter were removed to look through the windows. Frost buildup was observed on the regenerator beds. When the outside temperature is low enough for frosting, the outside air is typically free of pollen, mold spores and the like.

When frost was observed, firstly, it did not have to be dealt with unless it significantly sealed off flow through the regenerative heat exchangers. When air flow was sealed off, the gear motor (which turned the rotating air switch) was turned off using the gear motor switch. A significant blockage of airflow was determined in three ways. First, a significant reduction in fresh air flow into the room was felt by placing one's hand in the exiting airstream and feeling the diminished air flow. Second, the frost buildup was viewed through the windows with interior cover removed. If the air channels in the elastomer beds were not visible because they were filled with frost, significant blockage of air flow was assumed. Third, the negative gage pressure in the second compartment containing the fresh air blower was measured. This measurement was made using a magnehelic pressure gage in the customary manner. When air flow was significantly sealed off because of the frost build-up, the measured negative gage pressure in the second compartment containing the fresh air blower was approximately 0.5 inches of water. This pressure reading is close to the cut off pressure of the fresh air blower of 0.61 inches of water. The pressure measurement confirmed the first two qualitative measurements.

When the gear motor was turned off, heat recovery was turned off. Two of the elastomer regenerative heat exchangers received warm indoor air. The frost melted and a substantial portion of the liquid water was blown out because the blower motor was still turned on, and thus the fresh air blower and the stale air blower were still functioning. The gear motor was turned on and off with the gear motor switch, allowing the rotating air switch to rotate half a turn, then stop. This action defrosted and partially cleared the remaining two regenerative heat exchangers.

The ventilation rate of 70 CFM was sufficient to provide a third of an air change per hour for a 1500 square-foot residence. When the device was run with HEPA filter in the housing, it provided over four filtered air changes per hour for a 10-foot-by-12-foot bedroom with an 8 foot ceiling. This provided excellent air quality for an allergy or asthma sufferer for healthy sleeping.

The sensible heat recovery effectiveness of 85% was excellent. When the outside temperature was 40° F. less that the inside temperature, the heat loss was only about 130 W. The blower motor in the second compartment was placed so that its heat returned to the structure.

The invention may be modified. Although the present invention preferably utilizes four regenerator manifolds 182A–182D and four stationary regenerative heat exchangers 102A–102D, the number of regenerator manifolds and regenerative heat exchangers can be different than four. Two can be used, for example, by simply removing the center vertical bulkhead 304. In this case, there will be part of the time when stale airstream flows directly to the fresh air blower 114. This is known in the art as flow "short-circuiting". The amount of time that this occurs can be reduced by reducing the angle of the preferred pie shaped openings 270, 272, 274 to less than 90°. Reducing the angle to less than 90° does, however, increases flow resistance through the openings 270, 272, 274.

The preferred embodiment of the rotating air switch 116 having approximately 90° angled pie shaped openings 270, 272 and 274, with the two openings 272, 274 spaced approximately 90° apart, provides the largest opening for air flow to and from the regenerative heat exchangers 102A–102D and is most desirable because it provides minimal air pressure drop.

Instead of a separate gear motor 117 to operate the rotating air switch 116, power can be taken from the electric blower motor 120. This reduces cost of constructing the HRV 100, 100' and operating the HRV 100, 100' but, makes it difficult to stop the rotation of the rotating switch 116 while the blowers 112 and 114 are operating.

The clearance seals 118, 119 around the rotating air switch 116 may be replaced by tighter contact seals, as is known in the art, since flow through the clearance seals causes some stale air to return to the fresh airstream.

The housing 122, bulkheads 176, 178, 180, 302, 304, 306, 308. baffle 187 and air switch 116 of the HRV 100, 100' of the present invention can be fabricated of sheet metal, using conventional metal fabricating techniques. Alternatively they made be made of plastics, such as, but not limited to PVC, using suitable plastic molding techniques. Commercially available components are used for the HEPA filter, blowers, blower motor, switches, gear motor, pulleys, timing belt, electrical wire and electrical outlet materials used in the construction of the HRV 100, 100'.

While the present invention has now been described and exemplified with some specificity, those skilled in the at will appreciate the various modifications, including variations, additions, and omissions, that may be made in what has been described. Accordingly, it is intended that these modifications also be encompassed by the present invention and that the scope of the present invention be limited solely by the broadest interpretation that lawfully can be accorded the appended claims.

What is claimed is:

1. A heat recovery ventilator for use in ventilating a room, comprising means for venting a stale airstream of an indoor climate to the outside air, means for supplying a fresh airstream from the outside air of an outside climate, at least two stationary regenerative heat exchangers and a rotating air switch for transferring the stale airstream to the regenerative heat exchangers from the means for venting the stale airstream of the indoor climate and for transferring the fresh airstream from the regenerative heat exchangers to the means for supplying the fresh airstream from the outside air of the outside climate, said rotating air switch being rotatably mounted and including:

(a) a first circular side plate having an air flow opening therein, (b) a second circular side plate having a pair of air flow openings, said second plate spaced apart and disposed opposed and parallel to said first plate, and (c) a single manifold extending from said air flow opening in said first side plate to one of said pair of said air flow openings in said second side plate, said manifold enclosing said air flow opening in said first side plate and said one of said air flow openings in said second side plate and forming a fresh air passage way for transferring the fresh airstream from the regenerative heat exchangers to the means for supplying the fresh airstream from the outside air of the outside climate, said other opening in said second side plate forming a stale air passageway for transferring the stale airstream from the means for venting the stale airstream of the indoor climate to the regenerative heat exchangers; and wherein air flows in opposite directions through the same regenerative heat exchanger.

2. The heat recovery ventilator of claim 1, wherein said air switch is isolated from the outside climate by said regenerative heat exchangers.

3. The heat recovery ventilator of claim 1, further comprising a plurality of noncontacting clearance seals, one said noncontacting clearance seal disposed between said first circular plate of said rotating air switch and both the means for venting the stale airstream of the indoor climate and the means for transferring the fresh airstream from the outside air of the outside climate, and said remaining noncontacting clearance seals disposed between said second circular plate and said stationary regenerative heat exchangers.

4. The heat recovery ventilator of claim 1, further comprising four regenerative heat exchangers.

5. The heat recovery ventilator of claim 1, further comprising a filter, wherein said filter is disposed so that the fresh airstream flows through said filter before entering the room.

6. The heat recovery ventilator of claim 5, wherein said filter captures at least 99.97% of particles in the fresh airstream having a diameter greater than 0.3 microns.

7. The heat recovery ventilator of claim 1, wherein said regenerative heat exchangers are elastomer beds.

8. A heat recovery ventilator for use in a room, comprising a housing, two blowers, at least two stationary regenerative heat exchangers, a shaft, a single rotating air switch mounted on said shaft, a motor for driving said blowers and said shaft, one of said blowers for forcing a stale airstream out of the room; the other of said blowers for forcing a fresh airstream into the room, said air switch, in use, alternately imparting the stale airstream from one said blower to a regenerative heat exchanger, then imparting the fresh airstream to that same heat exchanger and through said other blower, when said air switch rotates in a 180° turn, wherein said rotating air switch has:

(a) a first side plate having an opening and having a center shaft aperture, (b) a second side plate having two openings spaced from each other, and a center shaft aperture, (c) a single manifold extending from said first side plate to said second side plate, wherein said manifold connects said opening of said first side plate with one of said openings in said second side plate forming a fresh air passageway, and (d) a shaft receiving portion extending from said first side plate to said second side plate;

wherein said rotating switch is disposed upon said shaft, said shaft disposed in said shaft receiving portion, and wherein, in use, the fresh airstream flows from said regenerative heat exchangers through said fresh air passageway and is forced out by said other blower, and wherein said other opening of said second side plate along with a portion of the manifold and a portion of the shaft receiving portion form a stale air passageway from said one blower to said regenerative heat exchangers, for transferring the stale airstream to said regenerative heat exchangers.

9. A rotating air switch for use in a heat recovery ventilator used in a room, the heat recovery ventilator of the type having a housing, a first blower, a second blower, at least two stationary regenerative heat exchangers, a shaft for mounting the air switch upon, a motor for driving the blowers and said shaft, the first blower for forcing a stale airstream out of the housing; the second blower for forcing a fresh airstream into the housing, the rotating air switch comprising:

(a) a first side plate having an opening and having a center shaft aperture, (b) a second side plate having two openings spaced from each other, and a center shaft aperture, (c) a shaft receiving portion extending from said first side plate to said second side plate and connecting said center shaft apertures, (d) a single manifold extending from said first side plate to said second side plate, said manifold connecting said opening on said first side plate with one of said openings in said second side plate and forming a fresh air passageway there between, said other of said openings of said second side plate along with a portion of said manifold and a portion of said shaft receiving portion forming a stale air passageway from said first blower to said regenerative heat exchanger, the rotating air switch, in use, alternately imparting the stale airstream from the first blower to a regenerative heat exchanger, then imparting the fresh airstream to that same regenerative heat exchanger.

10. The rotating air switch of claim 9, wherein said opening on said first side plate and said two openings of said second side plate are each pie shaped.

11. The rotating air switch of claim 10, wherein said opening on said first side plate and said two openings of said second side plate each subtend an angle of about 90°.

12. The rotating air switch of claim 9, wherein said manifold is pie shaped.

13. The rotating air switch of claim 9, wherein said opening on said first side plate, said two openings of said second side plate and said manifold are each pie shaped.

14. The rotating air switch of claim 9, wherein said opening on said first side plate and each said two openings of said second side plate subtend an angle of about 90° and said two openings of said second side plate are spaced about 90° apart.

15. The rotating air switch of claim 9, wherein when said rotating switch is disposed upon the shaft and travels through a 180° rotation, the fresh airstream flows from the regenerative heat exchangers through the fresh air passageway and is forced out of the housing by the second blower, and the first blower forces the stale airstream through the stale air passageway and into said same regenerative heat exchangers.

16. A method of providing indoor ventilation using a heat recovery ventilator having stationary rectangular regenerative heat exchangers, two blowers, one rotating air switch, a motor for driving the blower and air switch, all disposed in a housing, the housing having stale air openings for allowing a stale airstream to enter the housing and fresh air openings for allowing fresh air to exit from said housing; the method comprising a the steps of:

(a) forcing a stale airstream from an indoor climate into the housing, (b) blowing the stale airstream into the rotating air switch, (c) transporting the stale airstream from the rotating air switch into the stationary rectangular regenerative heat exchangers, (d) simultaneously exchanging heat and moisture from the stale airstream onto the regenerative heat exchangers and forcing the stale airstream to flow out of the housing, (e) forcing fresh air into the housing and through the same regenerative heat exchangers, (f) exchanging heat and moisture on the regenerative heat exchangers into the fresh airstream, (g) forcing the fresh airstream, which is heated and moisturized, into the rotating air switch and through the fresh air blower, and (h) forcing the fresh airstream, which is heated and moisturized, out of the housing and into the indoor climate, wherein the rotating air switch includes a first side plate having an opening and having a center shaft aperture, a second side plate having two openings spaced from each other, and a center shaft aperture, a shaft receiving portion extending from said first side plate to said second side plate and connecting said center shaft apertures, a single manifold extending from said first side plate to said second side plate, said manifold connecting said opening of said first side plate with one of said openings in said second side plate and forming a fresh air passageway there between, said other of said openings of said second side plate along with a portion of said manifold and a portion of said shaft receiving portion forming a stale air passageway from said first blower to said regenerative heat exchanger, and wherein the method further comprises in step (b) blowing the stale airstream into the stale air passageway, in step (c) transporting the stale airstream from the stale air passageway in the rotating air switch into the stationary regenerative heat exchangers, and in step (g) forcing the fresh airstream into the fresh air passageway in the rotating air switch and through the fresh air blower.

17. The method of claim 16, further comprising the step of providing a particulate filter to the housing and filtering the fresh airstream prior to step (h).

* * * * *